US008112089B2

(12) United States Patent  
Aoyama et al.

(10) Patent No.: US 8,112,089 B2  
(45) Date of Patent: Feb. 7, 2012

(54) RADIO PARAMETER DETERMINATION METHOD AND DEVICE FOR A RADIO COMMUNICATION SYSTEM

(75) Inventors: Akio Aoyama, Tokyo (JP); Koujirou Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1043 days.

(21) Appl. No.: 11/989,750

(22) PCT Filed: May 26, 2006

(86) PCT No.: PCT/JP2006/310530
§ 371 (c)(1),
(2), (4) Date: Jan. 31, 2008

(87) PCT Pub. No.: WO2007/020737
PCT Pub. Date: Feb. 22, 2007

(65) Prior Publication Data
US 2010/0105372 A1 Apr. 29, 2010

(30) Foreign Application Priority Data

Aug. 16, 2005 (JP) .................................. 2005-235945

(51) Int. Cl.
*H04W 40/00* (2009.01)
(52) U.S. Cl. ....................................................... 455/446
(58) Field of Classification Search ........... 455/446–449
See application file for complete search history.

(56) References Cited

U.S. PATENT DOCUMENTS 6,496,698 B2 * 12/2002 Jensen ........................... 455/447
6,631,267 B1 10/2003 Clarkson et al.
6,842,431 B2 1/2005 Clarkson et al.
2004/0259522 A1 * 12/2004 Alicherry et al. .......... 455/404.2
2005/0254455 A1 11/2005 Plehn et al.
2006/0083366 A1 4/2006 Aoyama et al.

FOREIGN PATENT DOCUMENTS

| JP | 09-154168 | 6/1997 |
| JP | 09-298766 | 11/1997 |
| JP | 10-112681 | 4/1998 |
| JP | 2001-203631 A | 7/2001 |
| JP | 2001-204069 A | 7/2001 |
| WO | WO 2004/043096 A2 | 5/2004 |
| WO | WO 2004/112414 A1 | 12/2004 |

* cited by examiner

*Primary Examiner* — Steven Lim
(74) *Attorney, Agent, or Firm* — Foley & Lardner LLP

(57) ABSTRACT

The present invention is directed toward realizing a radio parameter determination method for improving values indicating the communication service quality of important areas in a radio communication system. The configuration of the present invention includes: a second step for determining a second radio parameter based on the first radio parameter and the weighted sum of values indicating communication service quality in, as regards the areas in which a plurality of radio base stations are arranged, a first area and second area to which first weighting values have been conferred; a third step for accepting a limitation condition related to the weighted sum; and a fourth step for determining a third radio parameter based on the limitation condition accepted in the third step, the weighted sum of the value indicating service quality of the first area and second area to which second weighting values that differ from the first weighting values have been conferred, and the second radio parameter.

2 Claims, 13 Drawing Sheets

RADIO PARAMETER DETERMINATION METHOD AND DEVICE FOR A RADIO COMMUNICATION SYSTEM

This application is the National Phase of PCT/JP2006/310530, filed May 26, 2006, which claims priority to Japanese Application No. 2005-235945, filed Aug. 16, 2005, the disclosures of which are hereby incorporated by reference in their entirety.

TECHNICAL FIELD

The present invention relates to a radio communication system that contains a plurality of base stations, and more particularly, relates to a radio parameter determination method and radio parameter determination device that are used when determining the radio parameters of each base station for improving not only the communication service quality of all areas in the service areas of a radio communication system but also the communication service of important areas.

BACKGROUND ART

In a radio communication system that includes a plurality of base stations for providing communication service to mobile users or fixed users distributed over a plurality of areas, the radio parameters of each base station are determined to enable the provision of high-quality communication service when constructing the radio communication system or when making additions of radio stations to the already existing radio communication system.

One representative example of the radio parameters of each base station is the tilt angle of an antenna having directivity within a vertical plane. Other examples include the height of an antenna above the ground and the transmission power of the pilot channel that is transmitted from an antenna. The determination of radio parameters is typically realized by using a radio network design tool. A radio network design tool finds the propagation loss from the antenna to a prescribed location based on information such as the position, altitude, buildings, and topology of the base station in which the antenna is installed for which radio parameters are to be determined; calculates the reception power when a signal transmitted from the antenna is received at a prescribed location based on the transmission power from the antenna, the direction of the directivity within the horizontal plane of the antenna, the beam pattern within the horizontal plane and vertical plane of the antenna, and the previously found propagation loss; or calculates the reception quality indicated by the S/N (signal-to-noise) ratio or SIR (signal-to-interference ratio). Locations at which the reception power or reception quality do not satisfy prescribed values are then defined as "deterioration points," and the radio network design tool finds the deterioration rate, which is the proportion of all areas of the service area that is occupied by deterioration points.

In addition, the radio network design tool virtually generates mobile users, calculates the interference power caused by the generation of mobile users, and then, by determining whether the users can be accommodated, calculates the radio capacity that is defined by the number of users or the amount of traffic that can be accommodated. The radio network design tool can automatically find radio parameters for which the above-described deterioration rate is reduced or for which the radio capacity is increased.

Explanation next regards methods of automatically finding radio parameters implemented in the related art. The selection of an antenna that changes tilt angle, which is a representative radio parameter, and the determination of the angle of this antenna are realized as described hereinbelow.

"Antennas in which the deterioration rate of the coverage of one antenna is at least a prescribed value" are selected as antennas for which the tilt angle is to be decreased and the tilt angle of the selected antennas is set smaller. The alteration angle of the tilt angle when decreasing is assumed to be a fixed angle. In addition, "antennas in which the deterioration rate of the coverage of one antenna is no greater than a prescribed value" are selected as antennas for which the tilt angle is to be increased. The alteration angle of the tilt angle when increasing is assumed to be a fixed angle. The tilt angle for decreasing the deterioration rate of all areas is found by automatically repeating the above-described processes.

Other methods of altering the tilt angle relating to typical radio parameters indicate that "all algorithms can be used" in the "optimizing process" as in, for example, the wireless network optimizing method disclosed in JPA-2001-204069. More specifically, several methods exist, examples that can be offered including hereditary algorithms or typical optimizing algorithms in the field of set-optimizing that take as objective functions deterioration rate, coverage, and radio capacity. A radio communication system small in size in which the processing speed of the optimizing algorithm does not present problems would permit the use of a "round-robin algorithm" in which the set of all radio parameters is searched and tested.

For example, FIG. 10 shows the configuration of a conventional example of a radio parameter determination device that takes the deterioration rate as the objective function regarding the tilt angle of an antenna, which is a representative radio parameter. This example of the related art is composed of initial tilt angle input means 101 and all-area deterioration-rate-decreasing tilt angle determination means 102; wherein all-area deterioration-rate-decreasing tilt angle determination means 102 takes the initial tilt angle as the initial value, determines the tilt angle at which the deterioration rate of all areas is reduced, and supplies as output the tilt angle of all areas and the deterioration rate of all areas following the determination of tilt angle.

DISCLOSURE OF THE INVENTION

Problem to be Solved by the Invention

The problem in the conventional art is that the radio parameter determination method obtains radio parameters for improving the communication service quality of only all areas in the radio communication system.

Normally, an improvement of the communication service quality of all areas can offer high communication service quality to mobile users distributed over a plurality of areas.

However, important areas exist within the service areas, and there is consequently a demand that the communication service of these important areas be improved. These important areas are not necessarily related to the amount of traffic generated, and examples of such areas that can be offered include government offices, municipal offices, major highways, and schools or other locations that have been designated as evacuation sites.

As previously explained, although several methods exist for determining radio parameters for improving communication service quality that is expressed as the deterioration rate or radio capacity, to date, only the communication service quality of all areas in the service areas could be improved. On the other hand, a wireless network optimizing method was disclosed in the previously mentioned Patent Document 1 as an example for handling a plurality of objective functions. However, these objective functions were for network coverage, network capacity, and network coverage subjected to weighting according to traffic. The invention disclosed in Patent Document 1 had objective functions that subjected areas to weighting according to the traffic and did not have an objective function that related to important areas, and as a result, was incapable of determining radio parameters for improving the communication service quality of important areas.

Regarding important areas, although guidelines exist for determining radio parameters that permit a certain amount of deterioration of the communication service quality of all areas as long as the communication service quality of important areas is improved, there is as yet no radio parameter determination method that can appropriately cope with such determination guidelines.

The present invention was realized in view of the above-described problems and has as an object the provision of a radio parameter determination method for obtaining radio parameters for improving not only the communication service quality of all areas in the radio communication system but also the communication service quality of important areas.

Means for Solving the Problem

The radio parameter determination method of an antenna of a radio communication system according to the present invention is a method for determining radio parameters in each radio base station for determining the communication service quality of a radio communication system composed of a plurality of radio base stations, the method including:

a first step of accepting a first radio parameter that is an initial value;

a second step for determining a second radio parameter based on the first radio parameter and the weighted sum of values indicating communication service quality in, among areas in which the plurality of radio base stations are arranged, a first area and a second area to which first weighting values have been conferred;

a third step of accepting a limitation condition relating to the weighted sum of values indicating communication service quality in the first area and second area; and a fourth step of determining a third radio parameter based on the limitation condition accepted in the third step, a weighted sum of values indicating service quality of the first area and second area to which second weighting values that differ from the first weighting values have been added, and the second radio parameter.

In this case, the values indicating the communication service quality may be the deterioration rate.

Alternatively, the values indicating the communication service quality may be the radio capacity.

In addition, the limitation condition in the fourth step may be a limitation condition that takes as a standard the weighted sum of values indicating communication service quality of the first area and second area resulting from weighting values following the second radio parameter determination.

The first area may be important areas that include government offices, municipal offices, major highways, or facilities such as schools that have been designated as evacuation sites, and the second area may be all areas including the important areas.

Regarding the weighting values in the second step, the weighting value of important areas may be "0" and the weighting value of all areas may be "1"; and regarding the weighting values in the fourth step, the weighting value of important areas may be "1" and the weighting value of all areas may be "0."

Regarding the weighting values in the second step, the weighting value of important areas may be "1" and the weighting value of all areas may be "0"; and regarding the weighting values in the fourth step, the weighting value of important areas may be "0" and the weighting value of all areas may be "1." The radio parameter determination device of the radio communication system of the present invention includes:

means for accepting a first radio parameter that is the initial value;

means for determining a second radio parameter based on the first radio parameter and a weighted sum of values indicating communication service quality in, among the areas in which the plurality of radio base stations are arranged, a first area and second area to which first weighting values have been conferred;

means for accepting a limitation condition relating to the weighted sum of values indicating communication service quality in the first area and second area; and means for determining a third radio parameter based on the limitation condition accepted in the third step, the weighted sum of values indicating the service quality of the first area and second area to which has been conferred a second weighting value that differs from the first weighting value, and the second radio parameter.

EFFECTS OF THE PRESENT INVENTION

In the present invention that has the above-described configuration, the second radio parameter is determined based on: the first radio parameter, which is the initial value, and a weighted sum of values indicating the communication service quality in the first area and second area to which the first weighting values have been conferred; following which the third radio parameter is determined based on: a limitation condition, the weighted sum of values indicating the service quality of the first area and second area to which second weighting values have been conferred, and the second radio parameter.

The second radio parameter reflects the first weighting values, and the third radio parameter reflects the limitation condition and the second weighting values. The first and second weighting values are conferred to each of the first and second areas, and as a result, setting the first and second weighting values according to each area enables a radio parameter that focuses on not only the communication service quality of all areas, but also the communication service quality radio parameter of prescribed areas.

Figure 1:
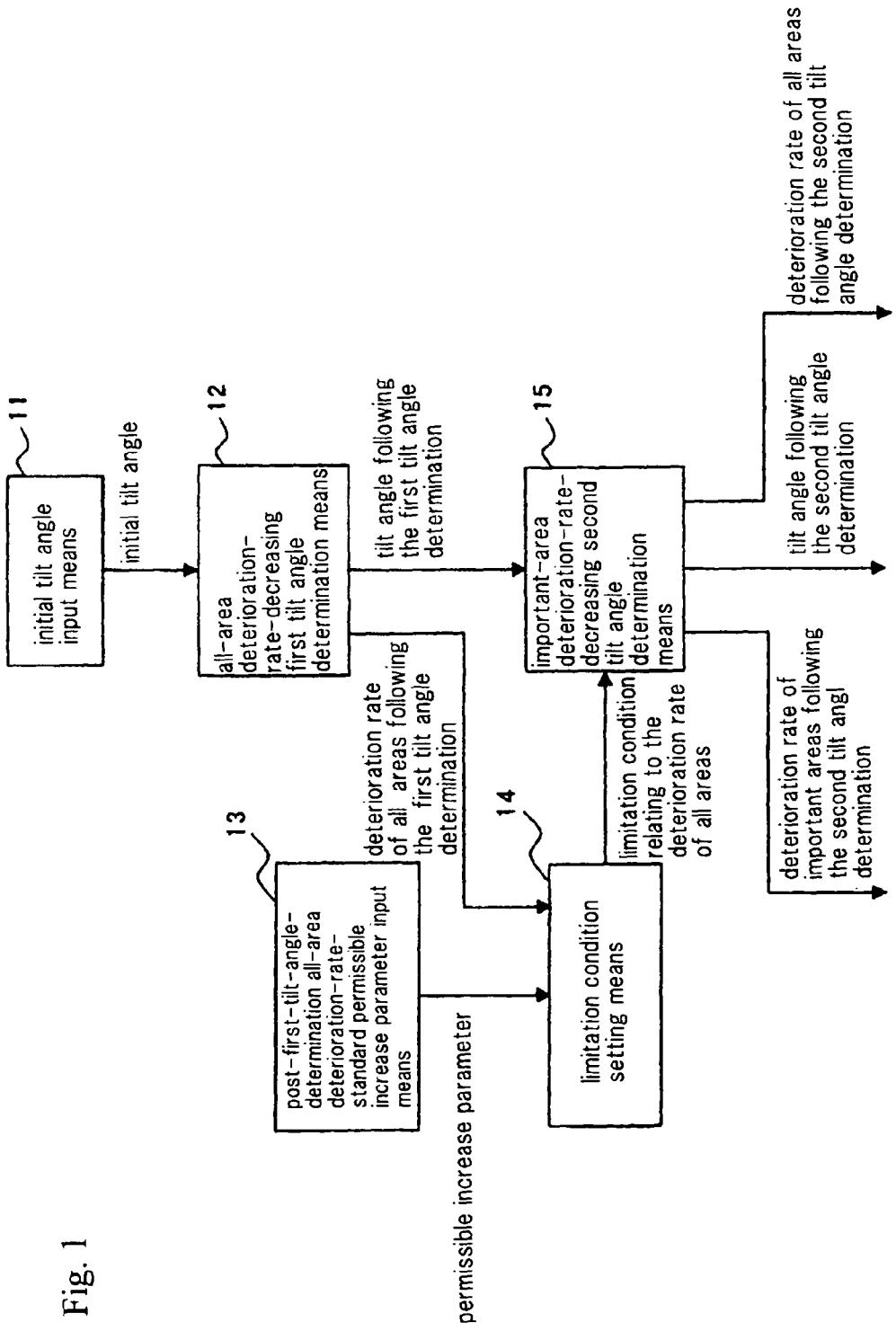
FIG. 1 is a block diagram showing the configuration of a tilt angle determination device according to the first embodiment of the present invention.

EXPLANATION OF THE REFERENCE NUMBERS 11 antenna initial tilt angle input means
12 all-area deterioration-rate-decreasing first tilt angle determination means
13 post-first-tilt-angle-determination all-area deterioration-rate-standard permissible increase parameter input means (permissible-increase parameter input means that takes as a standard the deterioration rate of all areas following the first tilt angle determination)
14 limitation condition setting means
15 important-area deterioration-rate-decreasing second tilt angle determination means
21 antenna initial tilt angle input means
22 important-area deterioration-rate-decreasing first tilt angle determination means
23 post-first-tilt-angle determination important-area deterioration-rate-standard permissible-increase parameter input means
24 limitation condition setting means
25 all-area deterioration-rate-decreasing second tilt angle determination means
31 antenna initial tilt angle input means
32 first-weighting-value important-area/all-area-deterioration rate weighted-sum-decreasing first tilt angle determination means (first tilt angle determination means for decreasing the weighted sum of the deterioration rate of all areas and important areas resulting from the first weighting values)
33 post-first-tilt-angle-determination first-weighting-value important-area/all-area deterioration-rate weighted-sum-standard permissible-increase-parameter input means (permissible increase parameter input means that takes as a standard the weighted sum of the deterioration rate of all areas and important areas resulting from the first weighting values following the first tilt angle determination)
34 limitation condition setting means
35 second-weighting-value important-area/all-area deterioration-rate weighted-sum-decreasing second-tilt-angle-determination means (second tilt angle determination means for decreasing the weighted sum of the deterioration rate of all areas and important areas resulting from the second weighting values)
36 important-area all-area first-weighting-value input means
37 important-area all-area second-weighting-value input means
101 initial tilt angle input means
102 all-area deterioration-rate-decreasing tilt angle determination means
110 all-area/important-area weighting-value deterioration-rate weighted sum calculation means (weighted sum calculation means for calculating the weighted sum of the deterioration rate resulting from the weighting values of important areas and all areas)
120 process switch means
130 tilt-angle-decreasing antenna selection means
140 first tilt angle updating means
145 post-updating tilt-angle all-area/important-area deterioration-rate weighting-value weighted-sum calculation means (means for calculating weighted sum realized by the weighting value of the deterioration rate of important areas and all areas in tilt angle after updating)
150 process switch/tilt angle updating control means (first tilt angle determination means)
160 tilt-angle-increasing antenna selection means
170 second tilt angle updating means
180 tilt-angle/deterioration-rate weighted-sum data storage means
190 tilt-angle/deterioration-rate weighted-sum output means
245 post-updating tilt-angle all-area/important-area deterioration-rate weighting-value weighted-sum calculation means (weighted sum calculation means for calculating the weighted sum realized by the weighting values of the deterioration rate of important areas and all areas in tilt angles after updating) (second tilt angle determination means)
250 process switch/tilt angle updating control means (second tilt angle determination means)
290 deterioration-rate weighted-sum output means
S1 step for setting initial tilt angles
S2 step for calculating deterioration rate Pb of all areas
S3 step for setting P1 current=Pb
S4 step for provisionally updating tilt angles
S5 step for calculating deterioration rate Pb of all areas
S6 step for setting P1temp=Pb
S7 step for determining whether the condition P1temp<P1current is satisfied
S8 step for not updating the tilt angles
S9 step for updating the tilt angles
S10 step for setting P1current=P1temp
S11 step for determining whether the termination condition is satisfied or not
S12 step for setting P1opt=P1current
S13 step for setting a permissible increase parameter that takes P1opt as a standard
S14 step for calculating deterioration rate Pa of important areas
S15 step for setting P2current=Pa
S16 step for provisionally updating tilt angles
S17 step for calculating deterioration rate Pa of important areas
S18 step for calculating deterioration rate Pb of all areas
S19 step for setting P2temp=Pa
S20 step for setting P1temp=Pb S21 step for determining whether P2temp<P2current is satisfied S22 step for not updating the tilt angles S23 step for determining whether P1temp<A*P1opt+B is satisfied S24 step of updating the tilt angle S25 step for making P2current=P2temp and P1current=P1temp S26 step for determining whether termination condition is satisfied or not S27 step for supplying as output the P1current, P2current, and tilt angle when the termination condition is satisfied S52 step for calculating deterioration rate Pa of important areas S53 step for setting P1current=Pa S55 step of calculating deterioration rate Pa of important areas S56 step for setting P1temp=Pa S64 step for calculating deterioration rate Pb of all areas S65 step for setting P2current=Pb S69 step for setting P2temp=Pb S70 step for setting P1temp=Pa S103 step for setting P1current=w1a·Pa+w1b·Pb S106 step for setting P1temp=w1a·Pa+w1b·Pb S115 step for setting P2current=w2a·Pa+w2b·Pb S119 step for setting P2temp=w2a·Pa+w2b·Pb S120 step for setting P1temp=w1a·Pa+w1b·Pb S201 step for setting important area w1a and all area w1b, which are the first weighting values S202 step for setting important area w2a and all area w2b, which are the second weighting values that differ from the first weighting value

BEST MODE FOR CARRYING OUT THE INVENTION

Explanation next regards the details of the embodiments of the present invention with reference to the accompanying figures.

In the working examples of the present invention, explanation regards a device and method for determining the tilt angle of an antenna, this tilt angle being a representative radio parameter. In addition, the deterioration rate is a value indicating that the communication service quality is to be improved.

Although radio parameters include, for example, the height of the antenna above ground and the transmission power of the pilot channel transmitted from the antenna in addition to the tilt angle of the antenna, this factor does not detract from the general applicability of the embodiments of the present invention.

In addition, although values that indicate the communication service quality that is to be improved include the radio capacity in addition to the deterioration rate, this factor does not detract from the general applicability of the embodiments of the present invention.

First Embodiment

FIG. 1 is a block diagram showing the configuration of the tilt angle determination device according to the first embodiment of the present invention.

The first embodiment is made up from: antenna initial tilt angle input means 11, all-area deterioration-rate-decreasing first tilt angle determination means 12, post-first-tilt-angle-determination all-area deterioration-rate-standard permissible increase parameter input means 13, limitation condition setting means 14, and important-area deterioration-rate-decreasing second tilt angle determination means 15.

Antenna initial tilt angle input means 11, upon receiving the input of the initial tilt angle from the user of the radio network design tool, supplies the initial tilt angle that has been received to all-area deterioration-rate-decreasing first tilt angle determination means 12.

All-area deterioration-rate-decreasing first tilt angle determination means 12 takes the initial tilt angle as the initial value and finds the tilt angle at which the deterioration rate of all areas is smaller than the time of the initial value and supplies the tilt angle that is found after the first tilt angle determination to important-area deterioration-rate-decreasing second tilt angle determination means 15.

The method of finding a tilt angle for decreasing the deterioration rate uses the method provided in, for example, PCT application of PCT/JP 2005/000506. A specific method is described hereinbelow.

A process is carried out for selecting "antennas in which the deterioration rate of the coverage of one antenna is at least a prescribed value" as antennas for which the tilt angle is to be decreased, and the tilt angle of the selected plurality of antennas is set smaller. When decreasing the tilt angle, the update angle of the tilt angle is a fixed angle. In addition, a process is carried out for selecting "antennas in which the deterioration rate of the coverage of one antenna is no greater than a prescribed value" as antennas for which tilt angle is to be increased, and the tilt angle of the selected plurality of antennas is set larger. When increasing the tilt angle, the update angle of the tilt angle is a fixed angle. When the deterioration rate of all areas is decreased by updating the tilt angle, the tilt angle is updated.

In addition to the above-described process of setting a tilt angle smaller and the process of setting a tilt angle larger, a process in which the process of updating the tilt angle when the deterioration rate of all areas decreases has been added, is repeated, and the tilt angle at which the deterioration rate of all areas decreases is found.

A specific example of the configuration of first tilt angle determination means 12 according to the above-described method will be explained hereinbelow.

A tilt angle for decreasing the deterioration rate of all areas is found by using a typical optimizing algorithm or a hereditary algorithm in the field of combined optimizing that takes the deterioration rate of all areas as the objective function. In addition, all-area deterioration-rate-decreasing first tilt angle determination means 12 simultaneously supplies limitation condition setting means 14 with the deterioration rate of all areas in the tilt angle after the first tilt angle determination.

Post-first-tilt-angle-determination all-area deterioration-rate-standard permissible increase parameter input means 13 receives the input of a permissible increase parameter that takes the deterioration rate of all areas as a standard after the first tilt angle has been determined from the user of the radio network design tool. Permissible increase parameter input means 13, having received this input, supplies the permissible increase parameter to limitation condition setting means 14.

Limitation condition setting means 14 uses the permissible increase parameter from post-first-tilt-angle-determination all-area deterioration-rate-standard permissible increase parameter input means 13 and the deterioration rate of all areas after the first tilt angle is determined to supply a limitation condition relating to the deterioration rate of all areas to important-area deterioration-rate-decreasing second tilt angle determination means 15.

Important-area deterioration-rate-decreasing second tilt angle determination means 15 finds the tilt angle at which the deterioration rate of important areas decreases more than at the time of the tilt angle after the first tilt angle is determined while taking the tilt angle after the first tilt angle determination as the initial value, and moreover, while satisfying the limitation condition relating to the deterioration rate of all areas, and supplies this tilt angle to the outside as the tilt angle that follows the second tilt angle determination.

The method of finding the tilt angle at which the deterioration rate decreases that is used in second tilt angle determination means 15 is the same method as the method used in all-area deterioration-rate-decreasing first tilt angle determination means 12 with the exception that "all areas" is replaced by "important areas." An example of the configuration of second tilt angle determination means 15 will be described hereinbelow. In addition, important-area deterioration-rate-decreasing second tilt angle determination means 15 supplies the deterioration rate of important areas in a tilt angle after the tilt angle and the determination rate of all areas have been determined, to the outside.

Figure 8:
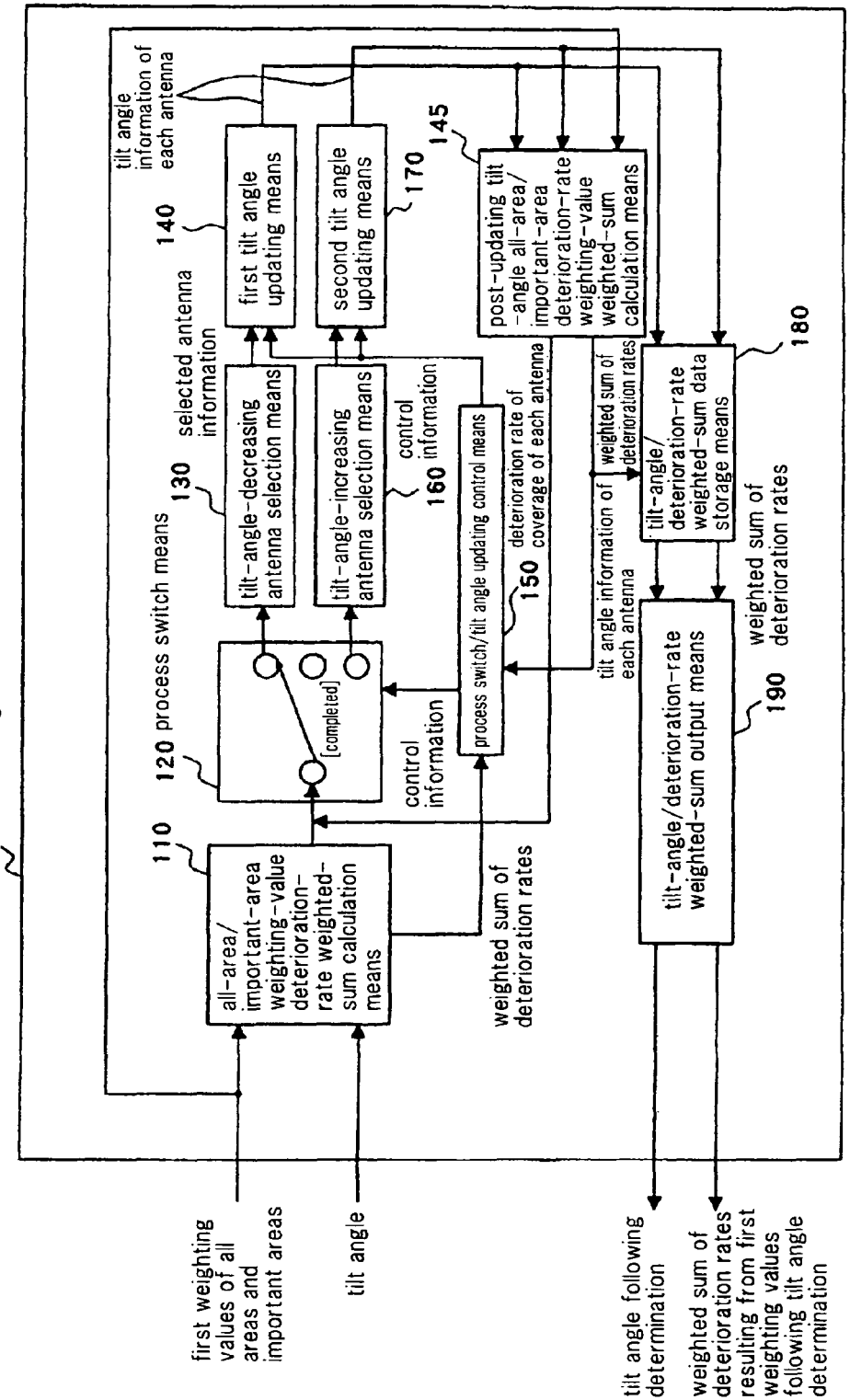
FIG. 8 is a block diagram showing an example of the configuration of the first tilt angle determination means in the first, second, and third embodiments of the present invention.

FIG. 8 is a block diagram showing the configuration of first tilt angle determination means 12, and the configuration shown in FIG. 8 can also be used for first tilt angle determination means 22 in the second embodiment and first tilt angle determination means 32 in the third embodiment that will be described later.

First tilt angle determination means 12 includes: all-area/important-area weighting-value deterioration-rate weighted sum calculation means 110 that calculates the weighted sum of the deterioration rate resulting from the weighting values of important areas and all areas based on the tilt angle that is received as input; process switch means 120 for process switching the processes of either terminating or selecting decreasing the tilt angle or increasing the tilt angle; tilt-angle-decreasing antenna selection means 130 for selecting an antenna for which the tilt angle is to be decreased based on the deterioration rate of coverage of each antenna received as input; tilt-angle-increasing antenna selection means 160 for selecting an antenna for which the tilt angle is to be increased based on the deterioration rate received as input; first tilt angle updating means 140 for decreasing by a fixed angle the tilt angle of an antenna selected by tilt-angle-decreasing antenna selection means 130; second tilt angle updating means 170 for increasing by a fixed angle the tilt angle of an antenna selected by tilt-angle-increasing antenna selection means 160; post-updating tilt-angle all-area/important-area deterioration-rate weighting-value weighted-sum calculation means 145 in which updating has been effected by first tilt angle updating means 140 or by second tilt angle updating means 170; process switch/tilt angle updating control means 150 for controlling the operations of process switch means 120, first tilt angle updating means 140, and second tilt angle updating means 170 in accordance with a decrease of the weighted sum of the deterioration rate of all areas and important areas or the number of inputs of the deterioration-rate weighted sum; tilt-angle/deterioration-rate weighted-sum data storage means 180 for storing data of tilt angles and deterioration-rate weighted sums that have been received as input; and tilt-angle/deterioration-rate weighted-sum output means 190 for receiving the output of tilt-angle/deterioration-rate weighted-sum data storage means 180 and supplying these data as the tilt angle of each antenna following determination if the tilt angle Of the above-described constituent elements, explanation first regards all-area/important-area weighting-value deterioration-rate weighted sum calculation means 110.

All-area/important-area weighting-value deterioration-rate weighted sum calculation means 110 calculates: the deterioration rate of the coverage of each antenna in a tilt angle that has been received as input, and the weighted sum resulting from the first weighting values of the deterioration rate of all areas and important areas. In the present embodiment, however, a tilt angle is first determined to decrease the deterioration rate of all areas, and the first weighting values are therefore set to "1" for all areas and "0" for important areas. As a result, the weighted sum of the deterioration rate that will be shown hereinbelow corresponds to the deterioration rate of all areas.

All-area/important-area weighting-value deterioration-rate weighted sum calculation means 110 supplies process switch means 120 with the deterioration rate of the coverage of each antenna described above, which is the calculation result, and further supplies process switch means 120 with the weighted sum realized by the first weighting value of the deterioration rate of all areas and important areas.

Process switch means 120 takes the output information from process switch control means 150 as input, and in accordance with this input, switches the deterioration rate of the coverage of each antenna that is separately received as input to tilt-angle-decreasing antenna selection means 130 or to tilt-angle-increasing antenna selection means 160 or terminates, without supplying information to either component, and ends the process.

Tilt-angle-decreasing antenna selection means 130 selects an antenna for which the tilt angle is to be decreased using the deterioration rate of the coverage of each antenna that is received as input from process switch means 120 and supplies the selected antenna information to first tilt angle updating means 140. The antenna selection operation is assumed to select "antennas for which the deterioration rate of coverage of one antenna is at least a prescribed value" as the antennas for which the tilt angle is to be decreased. Tilt-angle-increasing antenna selection means 160 differs from tilt-angle-decreasing antenna selection means 130 in that it selects antennas for which the tilt angle is to be increased, and in addition, the antenna selection operation differs from that of tilt-angle-decreasing antenna selection means 130 only in that "antennas for which the deterioration rate of the coverage of one antenna does not reach a prescribed value" are selected as antennas for which the tilt angle should be increased, the operation otherwise being identical to that of tilt-angle-decreasing antenna selection means 130. The information of antennas that are selected in tilt-angle-decreasing antenna selection means 130 or tilt-angle-increasing antenna selection means 160 is supplied to second tilt angle updating means 170.

Upon the input of control information from process switch/tilt angle updating control means 150, first tilt angle updating means 140 first carries out a process of returning the tilt angle that was updated immediately before to its original value. First tilt angle updating means 140 then takes as input the selected antenna information that is the output information of tilt-angle-decreasing antenna selection means 30, decreases the tilt angle of the selected antenna by the prescribed angle, and supplies the value of the decreased tilt angle to post-updating tilt-angle all-area/important-area deterioration-rate weighting-value weighted-sum calculation means 145 and to tilt-angle/deterioration-rate weighted-sum data storage means 180.

Second tilt angle updating means 170 has the same operations as first tilt angle updating means 140 except for updating the different direction of the tilt angle.

In other words, upon input of control information from process switch/tilt angle updating control means 150, second tilt angle updating means 170 carries out a process to return the tilt angle that was updated immediately before to its original value, then takes as input the selected antenna information that is the output information of tilt-angle-increasing antenna selection means 160 to increase the tilt angle of the selected antenna by the prescribed angle, and supplies the value of the increased tilt angle to post-updating tilt-angle all-area/important-area deterioration-rate weighting-value weighted-sum calculation means 145 and to tilt-angle/deterioration-rate weighted-sum data storage means 180.

Post-updating tilt-angle all-area/important-area deterioration-rate weighting-value weighted-sum calculation means 145 takes as input the tilt angle of each antenna after updating that is supplied from first tilt angle updating means 140 and second tilt angle updating means 170, calculates the deterioration rate of the coverage of each antenna, and supplies the result to process switch means 120. Post-updating tilt-angle all-area/important-area deterioration-rate weighting-value weighted-sum calculation means 145 further takes as input the first weighting values of all-area and important areas to calculate the weighted sum realized by the first weighting values of the deterioration rate of all areas and important areas in the tilt angle after updating, and then supplies the information of the weighted sum realized by the first weighting values of the deterioration rate of all areas and important areas in a tilt angle after updating to process switch/tilt angle updating control means 150 and to tilt-angle/deterioration-rate weighted-sum data storage means 180.

Process switch/tilt angle updating control means 150 receives as input the weighted sum of the deterioration rate of all areas and important areas that is the output from post-updating tilt-angle all-area/important-area deterioration-rate weighting-value weighted-sum calculation means 145 and carries out a switch operation according to the number of inputs of the weighted sum of the deterioration rate of all areas and important areas.

In other words, if the number of inputs of the weighted sum of the deterioration rate of all areas and important areas is at least a prescribed number, a control signal is supplied to process switch means 120 to cause switching, and further, a control signal is supplied to cause termination of the process if the number of instances of switching equals or exceeds a prescribed number.

When the weighted sum of the deterioration rate of all areas and important areas after updating a tilt angle does not decrease more than at the time of the processing after updating the preceding tilt angle, process switch/tilt angle updating control means 150 supplies first tilt angle updating means 140 and second tilt angle updating means 170 with a control signal for returning the updated tilt angle to its original value.

Tilt-angle/deterioration-rate weighted-sum data storage means 180 takes as input the information of the tilt angle of each antenna that is supplied by first tilt angle updating means 140 and second tilt angle updating means 170 and the weighted sum realized by the first weighting values of the deterioration rate of all areas and important areas that is supplied by post-updating tilt-angle all-area/important-area deterioration-rate weighting-value weighted-sum calculation means 145. Tilt-angle/deterioration-rate weighted-sum data storage means 180 then saves and stores the tilt angle information of each antenna and the weighted sum data resulting from the first weighting values of the deterioration rates of all areas and important areas that have been received as input, and then supplies the tilt angle information of each antenna and the weighted sum of deterioration rates of all areas and important areas that result form the first weighting values to tilt-angle/deterioration-rate weighted-sum output means 190.

Tilt-angle/deterioration-rate weighted-sum output means 190 supplies the tilt angle information of each antenna that is last supplied from tilt-angle/deterioration-rate weighted-sum data storage means 180 and data of the weighted sum of the deterioration rate realized by the first weighting values of all areas and important areas in this tilt angle.

Figure 9:
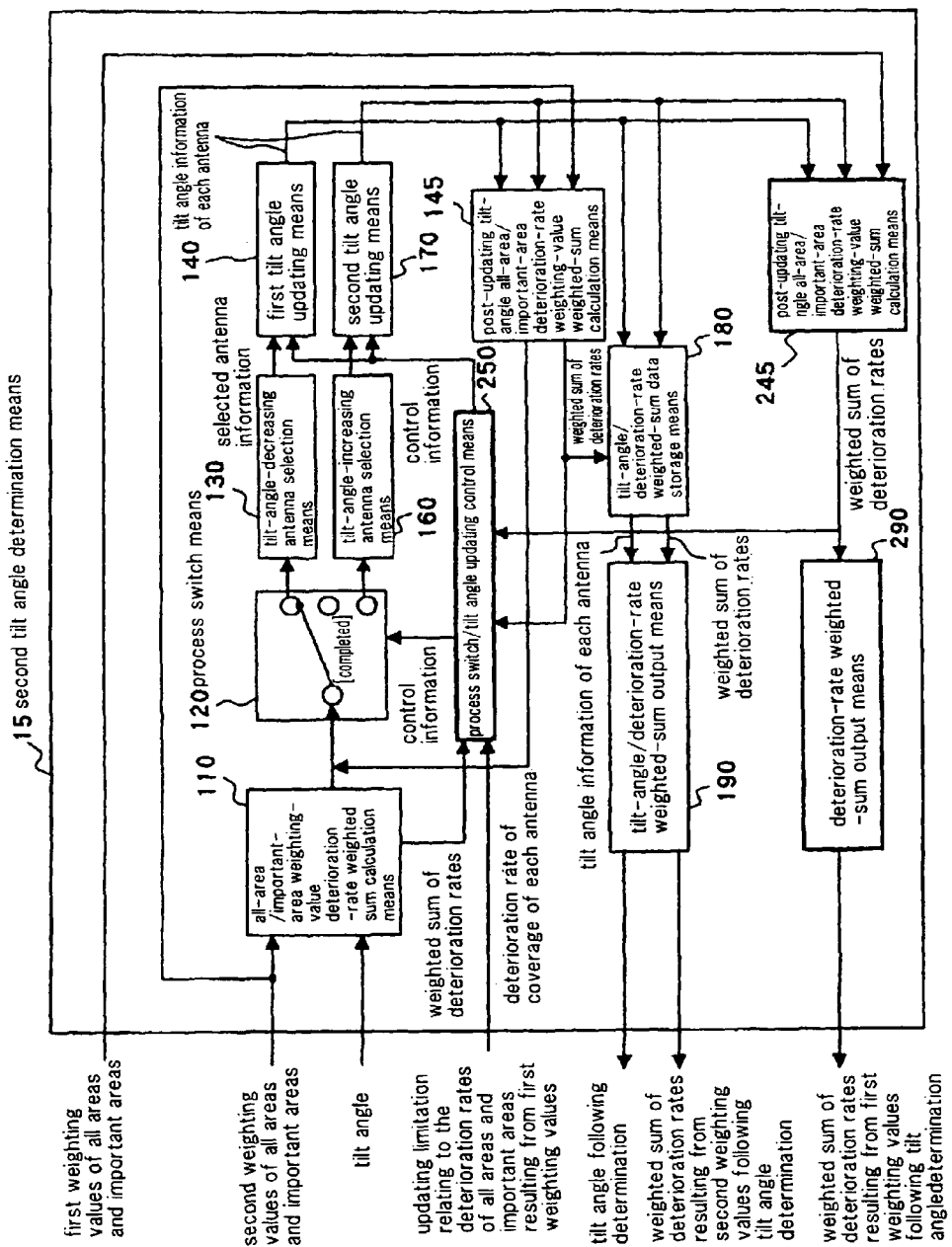
FIG. 9 is a block diagram showing an example of the configuration of the second tilt angle determination means in the first, second, and third embodiments of the present invention.
Figure 10:
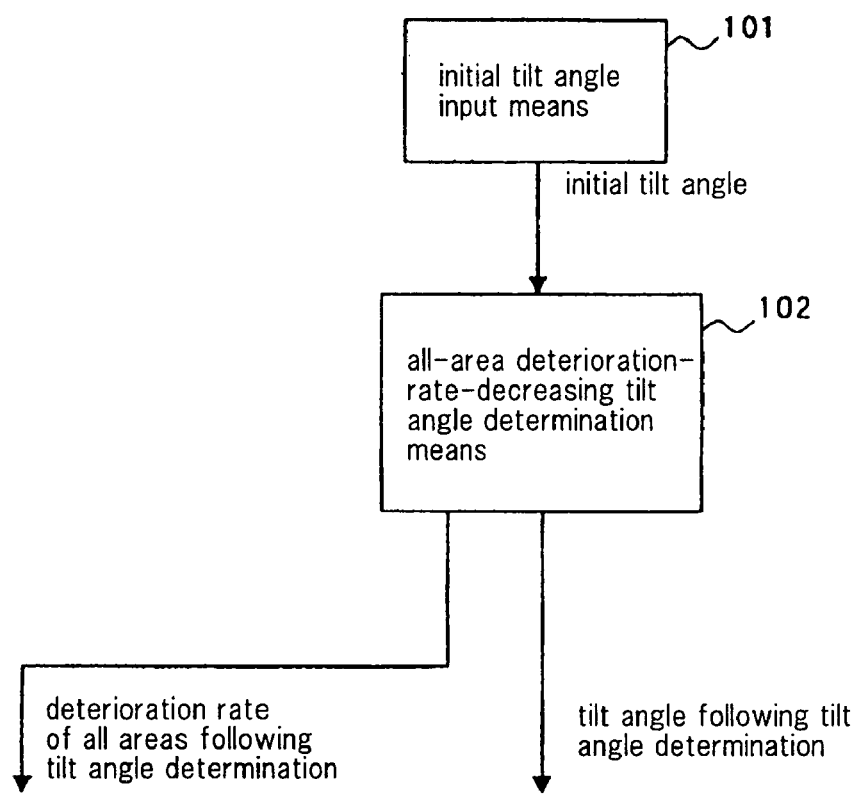
FIG. 10 is a block diagram showing the configuration of the tilt angle determination device of the related art.

FIG. 9 is a block diagram showing the configuration of second tilt angle determination means 15, and explanation next regards the details of the configuration of second tilt angle determination means 15 with reference to FIG. 9.

The configuration of second tilt angle determination means 15 shown in FIG. 9 is a configuration that can also be used for second tilt angle determination means 25 in the second embodiment and for second tilt angle determination means 35 in the third embodiment to be described later.

In addition to the configuration of first tilt angle determination means 12, second tilt angle determination means 15 includes: post-updating tilt-angle all-area/important-area deterioration-rate weighting-value weighted-sum calculation means 245, and deterioration-rate weighted-sum output means 290. In contrast with first tilt angle determination means 12, all-area/important-area weighting-value deterioration-rate weighted sum calculation means 110 and post-updating tilt-angle all-area/important-area deterioration-rate weighting-value weighted-sum calculation means 145 in second tilt angle determination means 15 receive as input the second weighting values of all areas and important areas and not the first weighting values of all areas and important areas. In addition, because the first embodiment is a construction in which a tilt angle for decreasing the deterioration rate of important areas is determined after determining the tilt angle for decreasing the deterioration rate of all areas, the second weighting value is set to "0" for all areas and to "1" for important areas.

Based on first weighting values of all areas and important areas that are supplied from the outside and the tilt angle information of each antenna that is supplied from first tilt angle updating means 140 and from second tilt angle updating means 170, post-updating tilt-angle all-area/important-area deterioration-rate weighting-value weighted-sum calculation means 245 calculates the weighted sum realized by the weighting values of the deterioration rate of all areas and important areas in the tilt angle after updating the tilt angle.

Post-updating tilt-angle all-area/important-area deterioration-rate weighting-value weighted-sum calculation means 245 supplies the weighted sum of the deterioration rate that is the result of calculation to process switch/tilt angle updating control means 250 and deterioration-rate weighted-sum output means 290.

In addition to the operation of process switch/tilt angle updating control means 150 in first tilt angle determination means 12, process switch/tilt angle updating control means 250 in second tilt angle determination means 15 takes as input information about updating limitations that relate to the deterioration rate of all areas and important areas resulting from first weighting values supplied from the outside and the weighted sum of the deterioration rate that is the output from post-updating tilt-angle all-area/important-area deterioration-rate weighting-value weighted-sum calculation means 245, and supplies control information, for returning a tilt angle that has been updated immediately before to its original value, to first tilt angle updating means 140 and to second tilt angle updating means 170 when the weighted sum of the deterioration rate supplied from post-updating tilt-angle all-area/important-area deterioration-rate weighting-value weighted-sum calculation means 245 does not satisfy the updating limitation conditions.

The configuration and operations of second tilt angle determination means 15 are otherwise identical to the configuration and operations of first tilt angle determination means 12.

Figure 2:
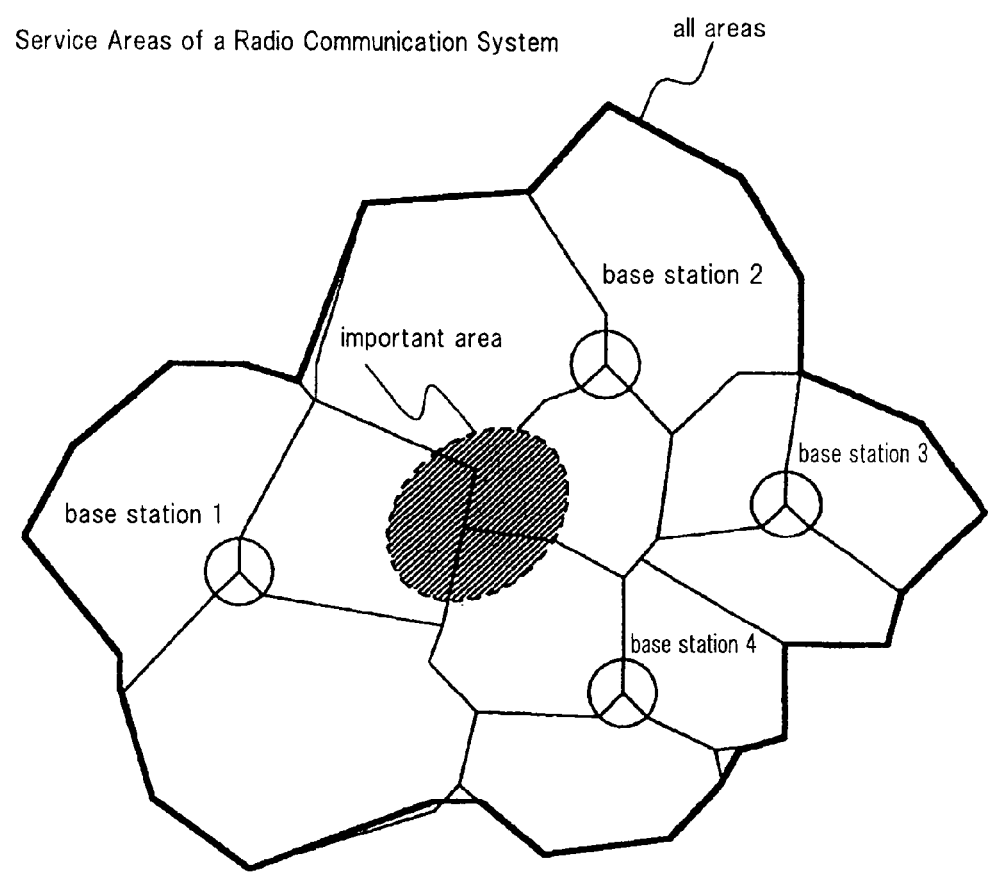
FIG. 2 is an example of the distribution of important areas and all areas in the service area of a radio communication system.

FIG. 2 shows an example of the planar distribution of important areas and all areas in radio communication service areas. Important areas are normally contained within all areas, and as a result, focusing only on the deterioration rate of important areas to implement adjustment in the determination of a tilt angle results in strong interference in areas other than the important areas and a large deterioration rate in all areas. On the other hand, when adjustment is implemented to decrease the deterioration rate in all areas, the deterioration rate of important areas becomes greater than the deterioration rate when focusing on only the deterioration rate of important areas to implement adjustment. In other words, there is a qualitative trade-off relation between the deterioration rate of important areas and the deterioration rate of all areas. Regarding the deterioration rates of important areas and all areas that are in a general trade-off relationship, the deterioration rate of all areas is first decreased in all-area deterioration-rate-decreasing first tilt angle determination means 12 in the present embodiment. Second tilt angle determination means 15 then takes the tilt angle determined in first tilt angle determination means 12 as the initial value and determines a tilt angle for decreasing the deterioration rate of important areas while satisfying the limitation condition resulting from a permissible increase parameter that takes the deterioration rate of all areas as a standard.

By adopting the above-described procedures, a tilt angle for decreasing the deterioration rate of important areas can be determined while suppressing an increase of the deterioration rate of all areas.

Figure 3A:
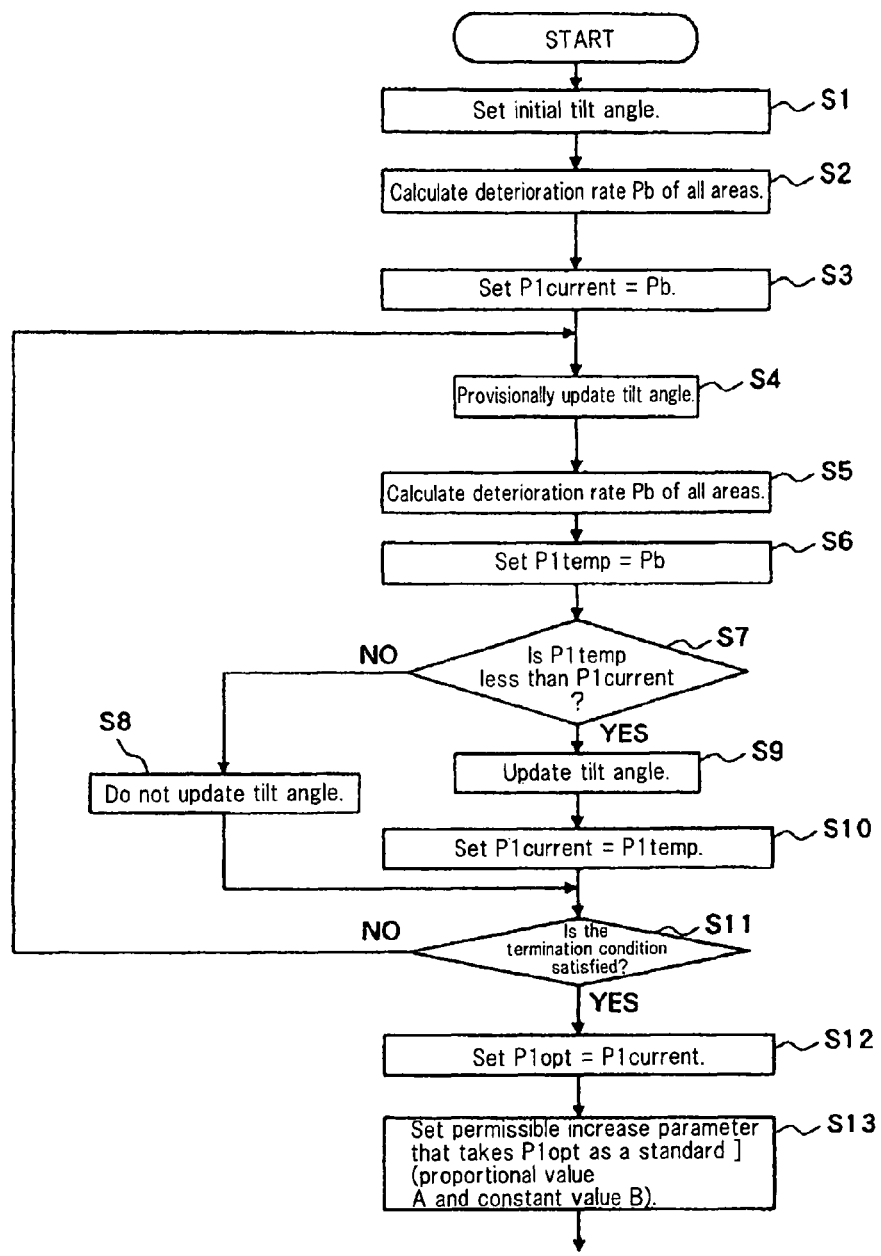
FIG. 3a is a flow chart showing the processing and operations of the tilt angle determination method that shows the operations of the first embodiment of the present invention.
Figure 3B:
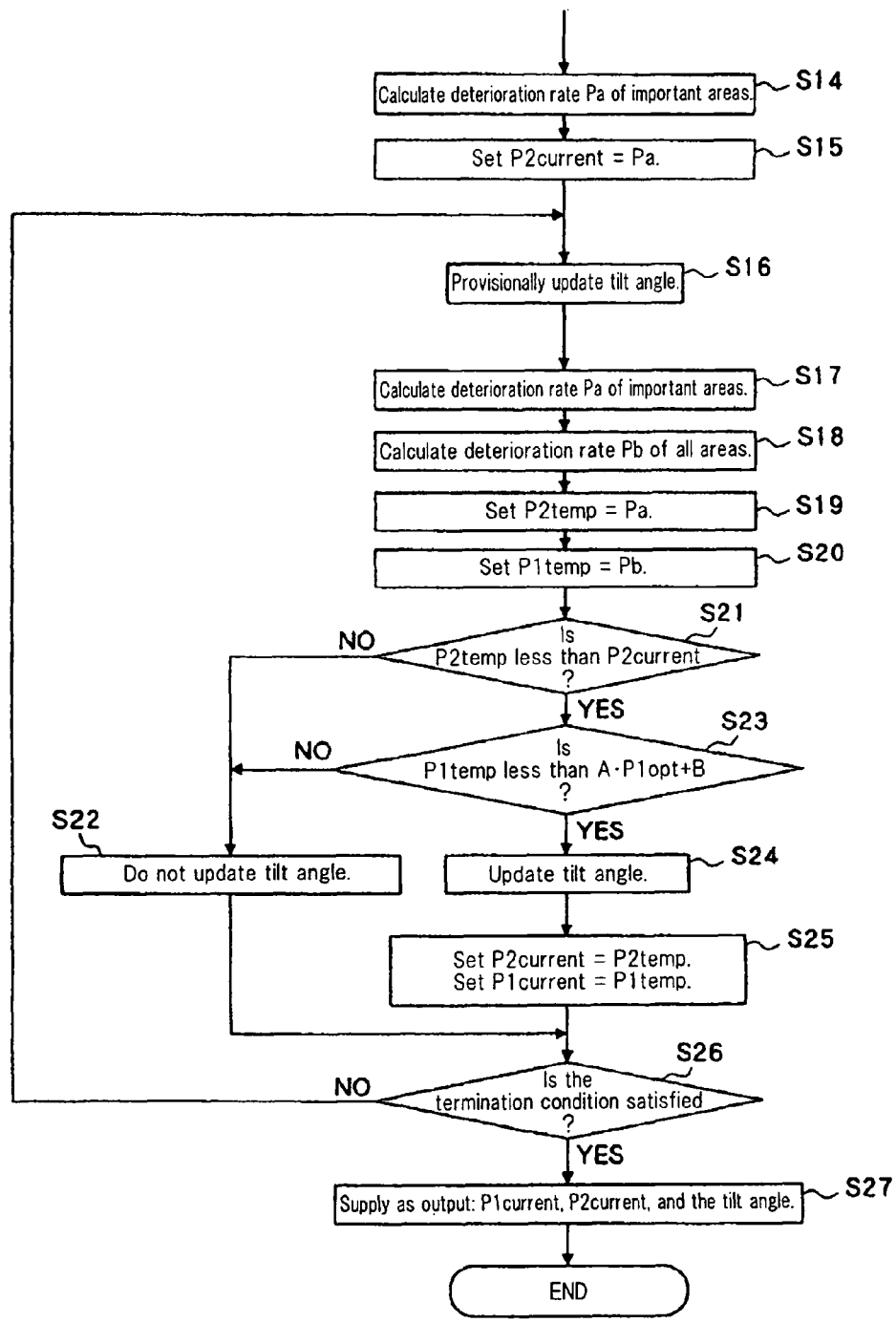
FIG. 3b is a flow chart showing the processing and operations of the tilt angle determination method that shows the operations of the first embodiment of the present invention.

FIGS. 3a and 3b are flow charts showing the operations of the present embodiment, and explanation next regards the processes for determining the tilt angle by the present embodiment with reference to FIGS. 3a and 3b.

The tilt angle determination process is made up from: a step for setting the initial tilt angle (Step S1), a step for calculating the deterioration rate Pb of all areas (Step S2), a step for setting P1current=Pb (Step S3), a step for provisionally updating a tilt angle (Step S4), a step for calculating deterioration rate Pb of all areas (Step S5), a step for setting P1temp=Pb (Step S6), a step for determining whether P1temp<P1current (Step S7), a step for not updating a tilt angle (Step S8), a step for updating a tilt angle (Step S9), a step for setting P1current=P1temp (Step S10), a step for determining whether a termination condition is satisfied or not (Step S11), a step of making P1opt=P1current (Step S12), a step for setting a permissible increase parameter that takes P1opt as a standard (Step S13), a step for calculating deterioration rate Pa of important areas (Step S14), a step for setting P2current=Pa (Step S15), a step for provisionally updating a tilt angle (Step S16), a step for calculating deterioration rate Pa of important areas (Step S17), a step for calculating deterioration rate Pb of all areas (Step S18), a step for setting P2temp=Pa (Step S19), a step for setting P1temp=Pb (Step S20), a step for determining whether P2temp<P2current (Step S21), a step for not updating a tilt angle (Step S22), a step for, as the limitation condition relating to the deterioration rate of all areas, determining whether P1temp<A*P1opt+B is satisfied (Step S23), a step for updating a tilt angle (Step S24), a step for setting P2current=P2temp and P1current=P1temp (Step S25), a step for determining whether a termination condition is satisfied or not (Step S26), and a step for supplying as output P1current and P2current, and the tilt angle when a termination condition is satisfied (Step S27).

The step for setting the initial tilt angle (Step S1), the step for calculating deterioration rate Pb of all areas (Step S2), and the step for setting P1current=Pb (Step S3) are implemented in all-area/important-area weighting-value deterioration-rate weighted sum calculation means 110 shown in FIG. 8 when the first weighting value of all areas and important areas is "1" for all areas and "0" for important areas.

The step for provisionally updating a tilt angle (Step S4) is implemented in tilt-angle-decreasing antenna selection means 130, tilt-angle-increasing antenna selection means 160, first tilt angle updating means 140, and second tilt angle updating means 170.

The step for calculating deterioration rate Pb of all areas (Step S5) is implemented in post-updating tilt-angle all-area/important-area deterioration-rate weighting-value weighted-sum calculation means 145 when the first weighting values of all areas and important areas are "1" for all areas and "0" for important areas.

The step for setting P1temp=Pb (Step S6) and the step for determining whether P1temp<P1current (Step S7) are implemented in process switch/tilt angle updating control means 150.

The step for not updating a tilt angle (Step S8) and the step for updating a tilt angle (Step S9) are implemented in first tilt angle updating means 140 and second tilt angle updating means 170.

The step for setting P1current=P1temp (Step S10) and the step for determining whether a termination condition is satisfied (Step S11) are implemented in process switch/tilt angle updating control means 150 and process switch means 120.

The step for making P1opt=P1current (Step S12) is implemented in tilt-angle/deterioration-rate weighted-sum data storage means 180 and tilt-angle/deterioration-rate weighted-sum output means 190.

The subsequent steps are processed by the configuration of second tilt angle determination means 15 shown in FIG. 9.

The step for setting the permissible increase parameter that takes P1opt as a standard (Step S13) is implemented in process switch/tilt angle updating control means 250 in second tilt angle determination means 15.

The step for calculating deterioration rate Pa of important areas (Step S14) and the step for setting P2current=Pa (Step S15) are implemented when the first weighting values of all areas and important areas that are applied as input to all-area/important-area weighting-value deterioration-rate weighted sum calculation means 110 are "0" for all areas and "1" for important areas.

The step for provisionally updating tilt angles (Step S16) is implemented in tilt-angle-decreasing antenna selection means 130, tilt-angle-increasing antenna selection means 160, first tilt angle updating means 140, and second tilt angle updating means 170.

The step for calculating deterioration rate Pa of important areas (Step S17) is implemented in post-updating tilt-angle all-area/important-area deterioration-rate weighting-value weighted-sum calculation means 145 when the second weighting values of all areas and important areas are "0" for all areas and "1" for important areas.

The step for calculating deterioration rate Pb for all areas (Step S18) is implemented in post-updating tilt-angle all-area/important-area deterioration-rate weighting-value weighted-sum calculation means 245 when the first weighting values of all areas and important areas are "1" for all areas and "0" for important areas.

The step of setting P2temp=Pa (Step S19), the step for setting P1temp=Pb (Step S20), the step for determining whether P2temp<P2current (Step S21), and the step for determining whether P1temp<A*P1opt+B is satisfied as the limitation condition relating to the deterioration rate of all areas (Step S23) are implemented in process switch/tilt angle updating control means 250.

The step for not updating a tilt angle (Step S22) and the step for updating a tilt angle (Step S24) are implemented in first tilt angle updating means 140 and second tilt angle updating means 170.

The step for setting P2current=P2temp and P1current=P1temp (Step S25) and the step for determining whether a termination condition is satisfied or not (Step S26) are implemented in process switch/tilt angle updating control means 250 and process switch means 120.

The step for supplying P1current and P2current and the step for updating the tilt angle when a termination condition is not satisfied (Step S27) are implemented in tilt-angle/deterioration-rate weighted-sum output means 190 and deterioration-rate weighted-sum output means 290.

Explanation next regards the details of the operations in each step.

In Step S1, the initial tilt angle received as input from the user of the radio network design tool is set as the initial value.

In Step S2, the deterioration rate Pb of all areas is calculated. In Step S3, P1current=Pb is set. In Step S4, the tilt angle of any antenna is provisionally updated by a certain angle.

A specific example of the method of provisionally updating the tilt angle is next shown. For example, a process of decreasing the tilt angle and a process of increasing the tilt angle are switched according to the number of instances of Step S4. As one example, a process for decreasing tilt angle is carried out if the number of instances of processing Step S4 is 1-10, 21-30, or 41-50. A process is carried out for selecting "antennas for which the deterioration rate of the coverage of one antenna is at least a prescribed value" as antennas for which the tilt angle should be decreased, and the tilt angle of the plurality of selected antennas is set smaller. When decreasing a tilt angle, the provisional update angle of the tilt angle is assumed to be a fixed angle.

Alternatively, as one example, a process is carried out for increasing the tilt angle if the number of instances of Step S4 is 11-20, 31-40, or 51-60. A process is carried out for selecting "antennas for which the deterioration rate of the coverage of one antenna falls below a prescribed value" as antennas for which the tilt angle should be increased, and the tilt angle of the plurality of selected antennas is set larger. The angle for provisionally updating the tilt angle when increasing the tilt angle, is assumed to be a fixed angle.

When other methods are used in the selection of antennas that are to be provisionally updated and in determining the angle at which the tilt angle is to provisionally updated, a typical optimizing algorithm or hereditary algorithm in the field of combined optimization that takes the deterioration rate as the objective function is used.

In Step S5, the deterioration rate Pb of all areas is calculated. Then, in Step S6, P1current=Pb is set relating it to P1 that is the objective function of the optimizing algorithm. Next, in Step S7, it is determined whether P1temp<P1current, and the process moves to the step in which the tilt angle is not updated (Step S8) if P1temp is not less than P1current, and moves to the step of implementing updating of the tilt angle that was provisionally updated in Step S4 (Step S9) if P1temp is less than P1current.

In Step S8, the process moves to the step for determining whether the termination condition is satisfied (Step S11) without implementing updating of the tilt angle that was provisionally updated in Step S4. In Step S9, updating of the tilt angle that was provisionally updated in Step S4 is implemented, following which the process moves to the step of setting P1current=P1temp (Step S10). In Step S10, P1current=P1temp is set, and the process moves to the step for determining whether the termination condition is satisfied (Step S11).

In Step S11, a process is carried out for determining whether the termination condition is satisfied. Specifically, a condition in which P1current does not attain a prescribed value or a condition in which the number of instances of repeating Step S11 is at least a prescribed number (as an example, 60 times) is used as the termination condition. If the termination condition has been satisfied, the process moves to the step for setting P1opt=P1current (Step S12). The process otherwise moves to Step S4 and the processes from Step S4 to Step S11 are repeated.

Next, in Step S12, P1opt=P1current is set according to satisfaction of the termination condition of Step S11.

In Step S12, the smallest deterioration rate in processing to this point is set to P1opt. In addition, the tilt angle of this time point is the tilt angle that realizes P1opt.

In Step S13, a permissible increase parameter that takes P1opt as a standard is set to the value applied as input from the user of the radio network design tool. More specifically, proportional value A and constant value B are set. Next, in Step S14, the deterioration rate Pa of important areas is calculated. In Step S15, P2current is assumed to be Pa. Next, in Step S16, the tilt angle of any antenna is provisionally updated by a certain angle. The method of provisional updating is assumed to be the same as in Step S4. In Step S17, deterioration rate Pa of important areas is calculated. In Step S18, deterioration rate Pb of all areas is calculated. Then, in Step S19, P2temp=Pa is set for P2, which is the objective function of the optimizing algorithm. Next, in Step S20, P1temp=Pb is set for P1, which is the function of the limitation condition.

In Step S21, it is determined whether P2temp<P2current, the process moving to the step in which the tilt angle is not updated (Step S22) if P2 temp is not less than P2current, and the process moving to the step in which it is determined whether P1temp<A*P1opt+B (Step S23) if P2temp is less than P2current.

In Step S23, it is determined whether P1temp<A*P1opt+B. If the condition P1temp<A*P1opt+B is not satisfied, the process moves to Step S22, and if the condition P1temp<A*P1opt+B is satisfied, the process moves to the step for updating the tilt angle (Step S24).

In Step S22, the tilt angle is not updated and the process moves to Step S26. In Step S24, updating is implemented for the tilt angle that was provisionally updated in Step S4 and the process then moves to Step S25.

In Step S25, P2current=P2temp and P1current=P1temp are set. In Step S26, a process is carried out to determine if the termination condition has been satisfied. More specifically, the condition that P2 current falls below a prescribed value or the condition that the number of repetitions of Step S26 is at least a prescribed number of times is used as the termination condition. When the termination condition has been satisfied, the process moves to Step S27. The process otherwise returns to Step S16, and the processes from Step S16 to Step S26 are repeated.

In Step S27, the P1current, P2 current, and the tilt angle at the time the termination condition was satisfied are supplied as output.

Based on the foregoing explanation, the present embodiment includes not only processing to decrease the deterioration rate of all areas, but also processing to decrease the deterioration rate of important areas. As a result, in contrast to the related art that enabled decrease of only the deterioration rate of all areas, the present embodiment enables the decrease of the deterioration rate of important areas. In the present embodiment, processing to decrease the deterioration rate of all areas is carried out first, the results of this processing are then used to implement processing to decrease the deterioration rate of important areas, and a limitation condition is applied such that the deterioration rate of all areas does not become excessively large in the processing to decrease the deterioration rate of important areas, whereby the present embodiment can decrease the deterioration rate of important areas while suppressing enlargement of the deterioration rate of all areas.

In the first embodiment, a case was described in which the tilt angle of antennas was taken as a radio parameter, but the radio parameter determination device of the present invention can be similarly implemented without any loss of general applicability if the object of updating is changed from the tilt angle of an antenna and replaced by the height of the antenna above the ground or by the transmission power of the pilot channel transmitted from the antenna.

A specific method of replacement relating to the height of an antenna above the ground is next described. Increase of the tilt angle of the antenna is replaced by decrease of the height above ground of the antenna, and decrease of the tilt angle of the antenna is replaced by increase of the height of the antenna above ground. Increasing the tilt angle of the antenna hinders the spread of the transmission power within the cover area, and decreasing the height of the antenna above the ground has the similar tendency of hindering the spread of the transmission power within the cover area. Decreasing the tilt angle of the antenna promotes the spread of the transmission power within the cover area, and raising the height of the antenna above the ground has the similar tendency of promoting the spread of transmission power within the cover area. In addition, the communication service quality including the deterioration rate is strongly related to the spread of the transmission power within the cover area, and the radio parameter determination device of the present invention can therefore be similarly implemented without any loss of the general applicability if the tilt angle of the antenna is replaced by the height of the antenna above the ground as the object of updating.

Another specific method of replacement relating to the transmission power of a pilot channel transmitted from the antenna is next described. Increasing the tilt angle of the antenna is replaced by decreasing the transmission power of the pilot channel, and decreasing the tilt angle of the antenna is replaced by increasing the transmission power of the pilot channel. Increasing the tilt angle of the antenna hinders the spread of transmission power within the cover area, and decreasing the transmission power of the pilot channel has the similar tendency of hindering the spread of the transmission power within the cover area. In addition, decreasing the tilt angle of the antenna promotes the spread of transmission power within the cover area, and increasing the transmission power of the pilot channel has the similar tendency of promoting the spread of transmission power within the cover area. In addition, the communication service quality including the deterioration rate is strongly related to the spread of transmission power within the cover area, and the radio parameter determination device according to the present invention can therefore be similarly implemented without any loss of the general applicability if the tilt angle of the antenna is replaced by the transmission power of the pilot channel as the object of updating.

However, in contrast to deterioration rate, which is found by calculating the proportion within a designated area that is occupied by points at which reception quality or reception power of a prescribed value is not achieved, the radio capacity is found by calculating the amount of traffic or the number of users that can be accommodated by virtually generating mobile users within a designated area, calculating the interference power caused by the generation of the mobile users, and then determining whether users can be accommodated.

Replacing processes for decreasing the deterioration rate that have been described in the first embodiment with processes for increasing radio capacity means only that the deterioration rate is replaced by the radio capacity as the objective function and that processes for decreasing the deterioration rate are replaced by processes for increasing the radio capacity, and the general applicability of the radio parameter determination device according to the present invention is not lost. In other words, the processes for decreasing the deterioration rate in the first embodiment are replaced by processes for increasing the radio capacity, whereby increase of radio capacity can be implemented similarly to decrease of the deterioration rate.

The present embodiment according to the foregoing description has the effect of obtaining radio parameters for improving communication service quality of the deterioration rate or radio capacity not only in all areas but in important areas as well.

Second Embodiment

Figure 4:
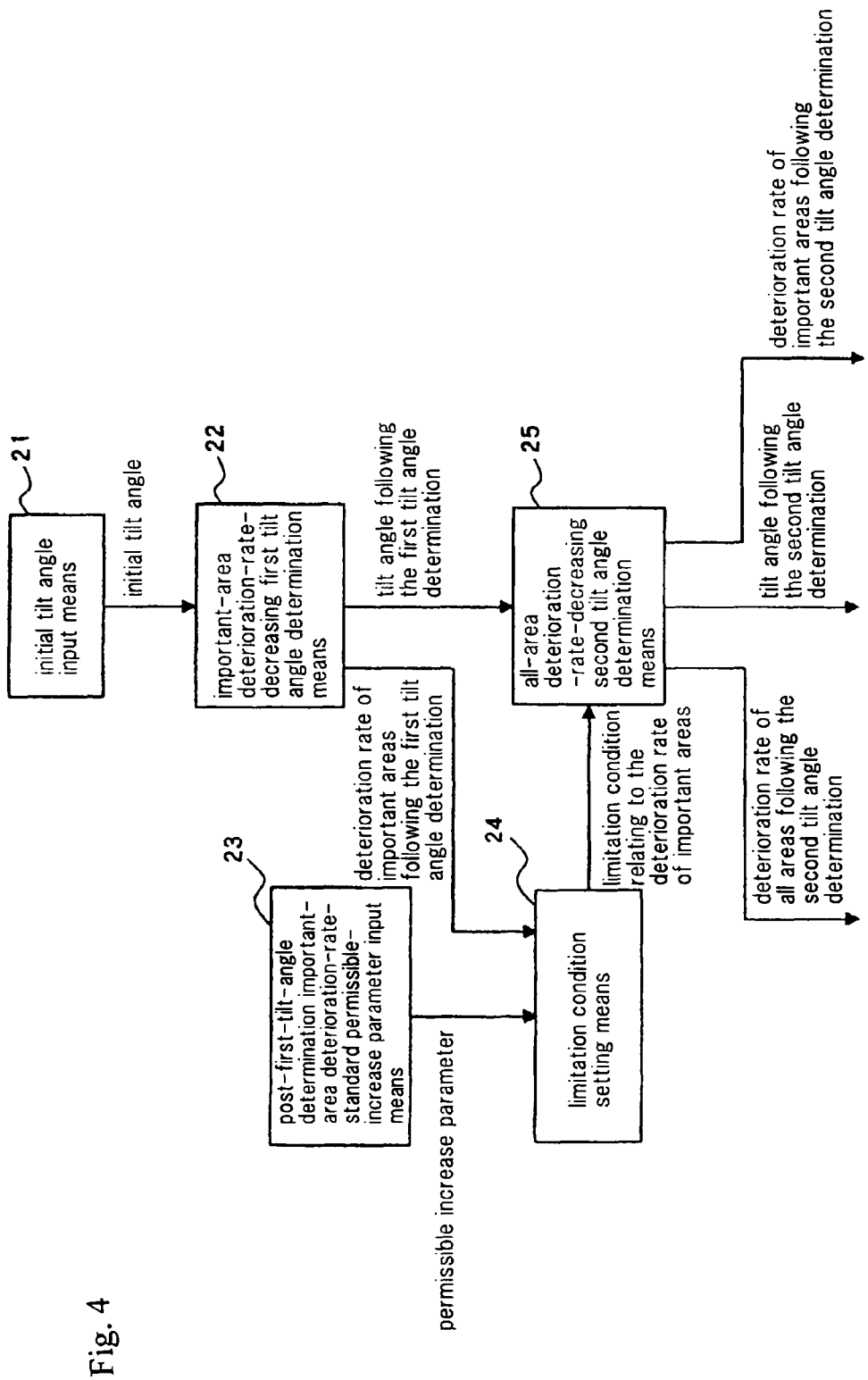
FIG. 4 is a block diagram showing the configuration of the tilt angle determination device according to the second embodiment of the present invention.

FIG. 4 is a block diagram showing the configuration of the tilt angle determination device according to the second embodiment of the present invention.

The second embodiment is equivalent to processing in which all areas and important areas in the first embodiment are exchanged.

More specifically, in contrast to the first embodiment in which a process is first carried out for decreasing the deterioration rate of all areas and a process is then carried out for decreasing the deterioration rate of important areas while satisfying a limitation condition of the deterioration rate of all areas, the second embodiment is a device for carrying out processing in which this order is exchanged, a process first being carried out for decreasing the deterioration rate of important areas and then carrying out processing for decreasing the deterioration rate of all areas while satisfying a limitation condition of the deterioration rate of important areas.

The second embodiment is made up from: antenna initial tilt angle input means 21, important-area deterioration-rate-decreasing first tilt angle determination means 22, post-first-tilt-angle determination important-area deterioration-rate-standard permissible-increase parameter input means 23, limitation condition setting means 24, and all-area deterioration-rate-decreasing second tilt angle determination means 25.

Antenna initial tilt angle input means 21 accepts the input of the initial tilt angle from the user of the radio network design tool and then supplies the initial tilt angle to important-area deterioration-rate-decreasing first tilt angle determination means 22.

Important-area deterioration-rate-decreasing first tilt angle determination means 22 takes the initial tilt angle as an initial value, finds a tilt angle at which the deterioration rate of important areas becomes less than at the time of the initial value, and supplies this tilt angle to all-area deterioration-rate-decreasing second tilt angle determination means 25. The method of finding the tilt angle for which the deterioration rate decreases is the same as in the first embodiment. In addition, important-area deterioration-rate-decreasing first tilt angle determination means 22 simultaneously supplies limitation condition setting means 24 with the deterioration rate of important areas in the tilt angle following the first tilt angle determination.

Post-first-tilt-angle determination important-area deterioration-rate-standard permissible-increase parameter input means 23 accepts the input of a permissible increase parameter that takes as a standard the deterioration rate of important areas following the first tilt angle determination from the user of the radio network design tool. Permissible increase parameter input means 23 then supplies the permissible increase parameter to limitation condition setting means 24.

Limitation condition setting means 24 uses the permissible increase parameter from post-first-tilt-angle determination important-area deterioration-rate-standard permissible-increase parameter input means 23 and the deterioration rate of important areas after the first tilt angle is determined, and supplies the limitation condition relating to the deterioration rate of important areas to all-area deterioration-rate-decreasing second tilt angle determination means 25. All-area deterioration-rate-decreasing second tilt angle determination means 25 takes the tilt angle following the first tilt angle determination as the initial value, and further, finds the tilt angle at which the deterioration rate of all areas becomes smaller than when the first tilt angle was determined, while satisfying the limitation condition relating to the deterioration rate of the important areas, and supplies this tilt angle to the outside as the tilt angle following the second tilt angle determination. The method of finding the tilt angle at which the deterioration rate decreases used in the second tilt angle determination means is the same as in the first embodiment. In addition, all-area deterioration-rate-decreasing second tilt angle determination means 15 further supplies the deterioration rate of important areas and the deterioration rate of all areas in the tilt angle after the second tilt angle is determined to the outside.

The configuration and operations of first tilt angle determination means 22 in the second embodiment are identical to the configuration and operations of the first tilt angle determination means 12 in the first embodiment. However, the operations are implemented when the first weighting values of all areas and important areas that are applied as input to important-area weighting-value deterioration-rate weighted sum calculation means 110 are "0" for all areas and "1" for important areas.

The configuration and operations of second tilt angle determination means 25 in the second embodiment are identical to the configuration and operations of second tilt angle determination means 15 in the first embodiment. However, the operations are implemented when the second weighting values of all areas and important areas that are applied as input to important-area weighting-value deterioration-rate weighted sum calculation means 110 are "1" for all areas and "0" for important areas.

Figure 5A:
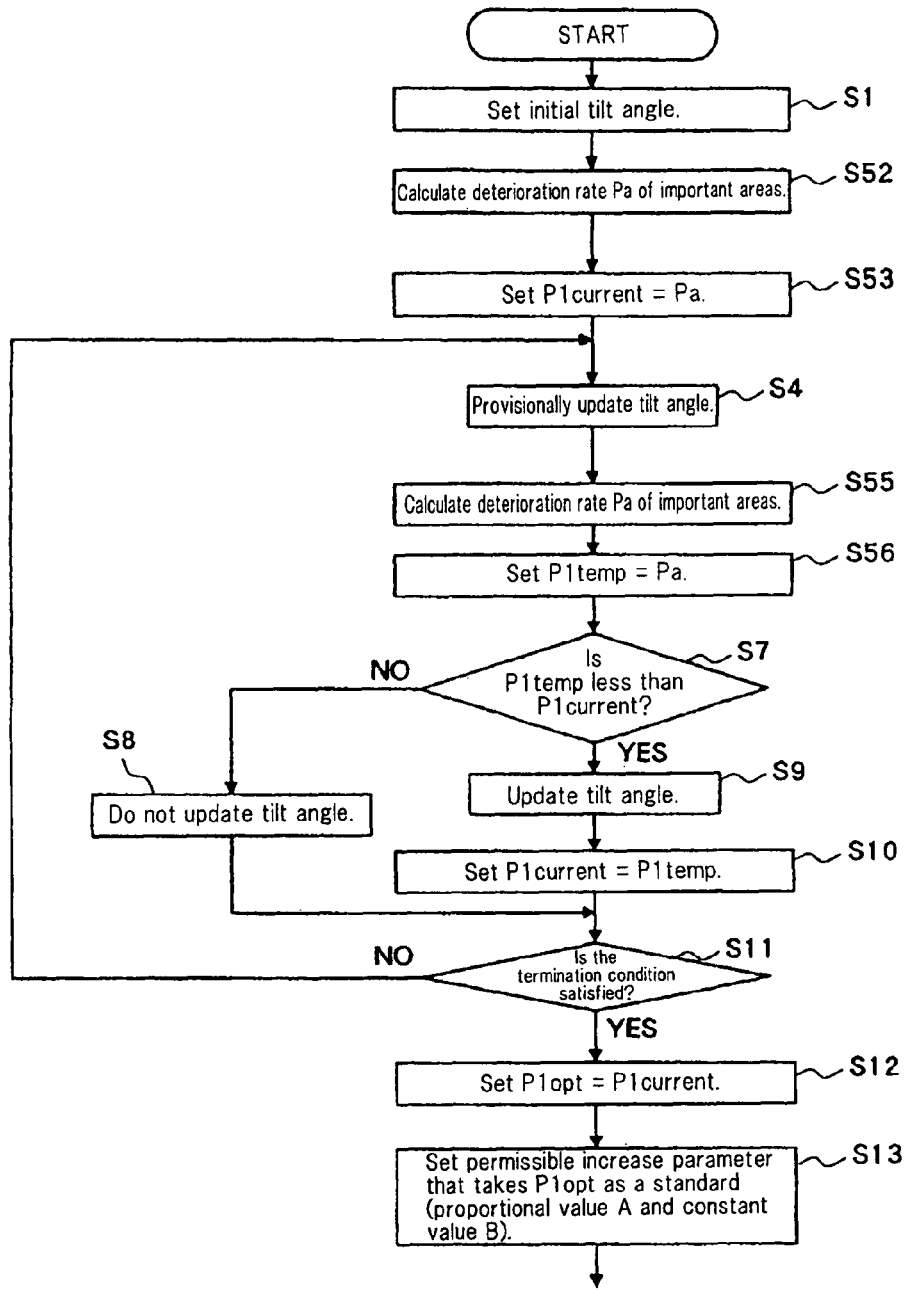
FIG. 5a is a flow chart showing the processing and operations of the tilt angle determination method that shows the operations of the second embodiment of the present invention.
Figure 5B:
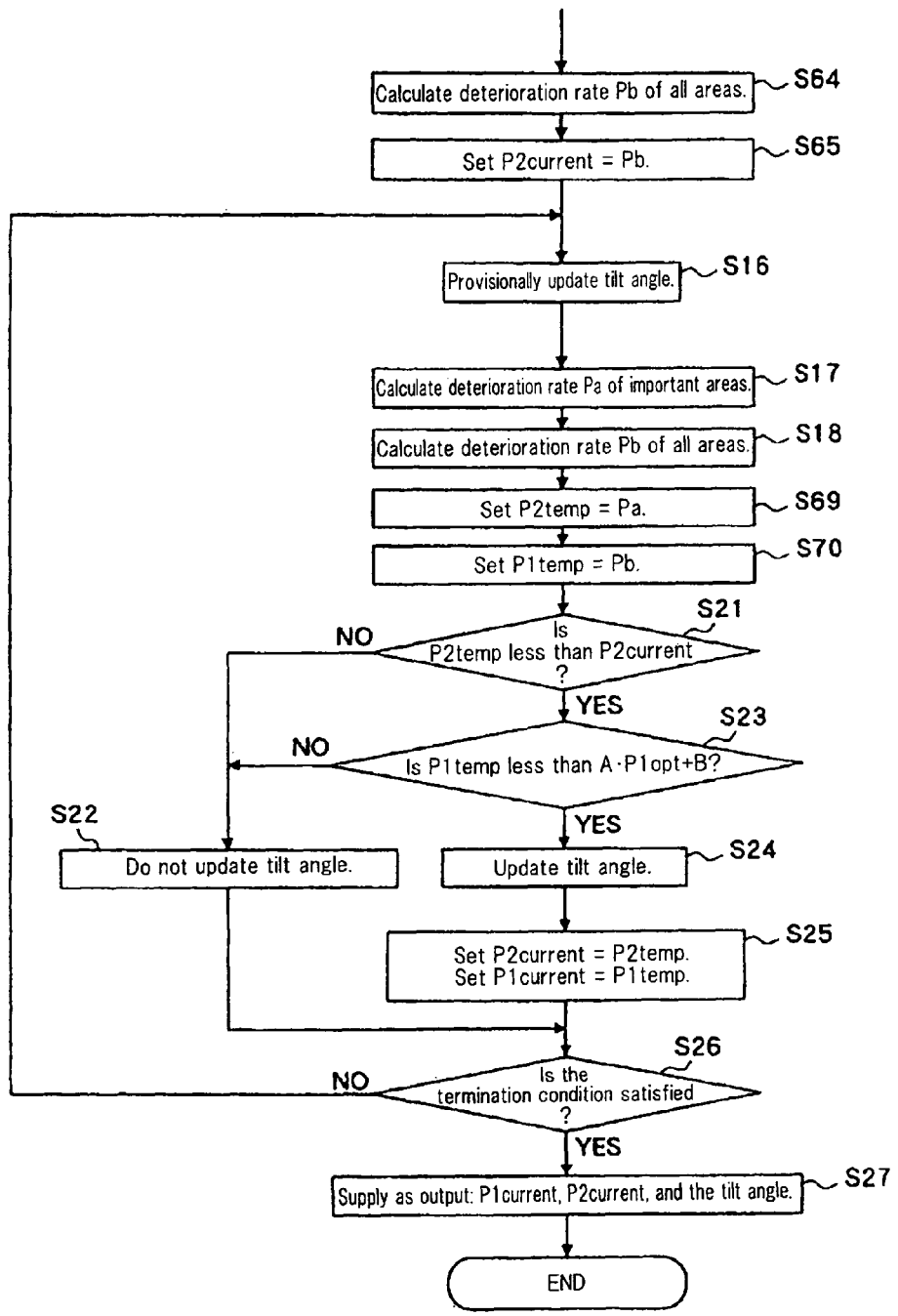
FIG. 5b is a flow chart showing the processing and operations of the tilt angle determination method that shows the operations of the second embodiment of the present invention.

FIGS. 5a and 5b are flow charts showing the processes and operations in the present embodiment.

The flow charts of FIGS. 5a and 5b are basically identical to the flow charts of FIG. 3 explained in the first embodiment, but differ in the following steps:

The step for calculating deterioration rate Pb of all areas (Step S2) is replaced by a step of calculating deterioration rate Pa of important areas (Step S52).

The step for setting P1current=Pb (Step S3) is replaced by the step for setting P1current=Pa (Step S53).

The step for calculating deterioration rate Pb of all areas (Step S5) is replaced by a step for calculating deterioration rate Pa of important areas (Step S55).

The step for setting P1temp=Pb (Step S6) is replaced by the step for setting P1temp=Pa (Step S56).

The step for calculating deterioration rate Pa of important areas (Step S14) is replaced by a step for calculating deterioration rate Pb of all areas (Step S64).

The step for setting P2current=Pa (Step S15) is replaced by the step for setting P2current=Pb (Step S65).

The step for setting P2temp=Pa (Step S19) is replaced by the step for setting P2temp=Pb (Step S69).

The step for setting P2temp=Pa (Step S20) is replaced by the step for setting P2temp=Pb (Step S70).

The operations in the present embodiment are basically identical to those of the first embodiment with the exception of the differing processes of the above-described replaced steps.

As described hereinabove, in contrast to the first embodiment in which the process for decreasing the deterioration rate of all areas is implemented first and the result of this process is then used to implement the process of decreasing the deterioration rate of important areas, in the second embodiment, the process for decreasing the deterioration rate of important areas is implemented first and the results are then used to implement the process of decreasing the deterioration rate of all areas. In addition, the limitation condition is applied in the process for decreasing the deterioration rate of all areas to prevent the deterioration rate of important areas from becoming excessively large.

As shown in the foregoing explanation, the present embodiment includes not only a process for decreasing the deterioration rate of all areas but also a process for decreasing the deterioration rate of important areas, as in the first embodiment. As a result, the present embodiment enables a decrease of the deterioration rate of important areas, in contrast to the method of the related art that enables a decrease of only the deterioration rate of all areas.

In addition, the present embodiment carries out a process for decreasing the deterioration rate of important areas first, uses the results of this process to implement a process for decreasing the deterioration rate of all areas, and implements a limitation condition in the process for decreasing the deterioration rate of all areas such that the deterioration rate of important areas does not become excessively large, and therefore enables a decrease of the deterioration rate of all areas while suppressing an increase of the deterioration rate of important areas, i.e., while keeping important areas at a fixed low value. In other words, the present embodiment enables not only a decrease of the deterioration rate of all areas but also enables a decrease of the deterioration rate of important areas.

In the second embodiment, a case was described in which the tilt angle of an antenna was taken as a radio parameter, but the radio parameter determination device of the present invention can be similarly implemented without any loss of general applicability if the object of updating is changed from the tilt angle of an antenna and replaced by the height of the antenna above the ground or by the transmission power of the pilot channel transmitted from the antenna. The specific replacement methods are identical to the replacement methods described in the first embodiment.

Replacing processing for decreasing the deterioration rate that have been described in the second embodiment with processing for increasing radio capacity means only that the deterioration rate is replaced by the radio capacity as the objective function and that processing for decreasing the deterioration rate is replaced by processing for increasing the radio capacity, and the general applicability of the radio parameter determination method according to the present invention is not lost. In other words, processing for decreasing the deterioration rate in the second embodiment is replaced by processing for increasing the radio capacity, whereby an increase of radio capacity can be implemented similar to a decrease of the deterioration rate.

The present embodiment according to the foregoing description has the effect of obtaining radio parameters for improving communication service quality, i.e., deterioration rate or radio capacity, not only in all areas but in important areas as well.

Third Embodiment

Figure 6:
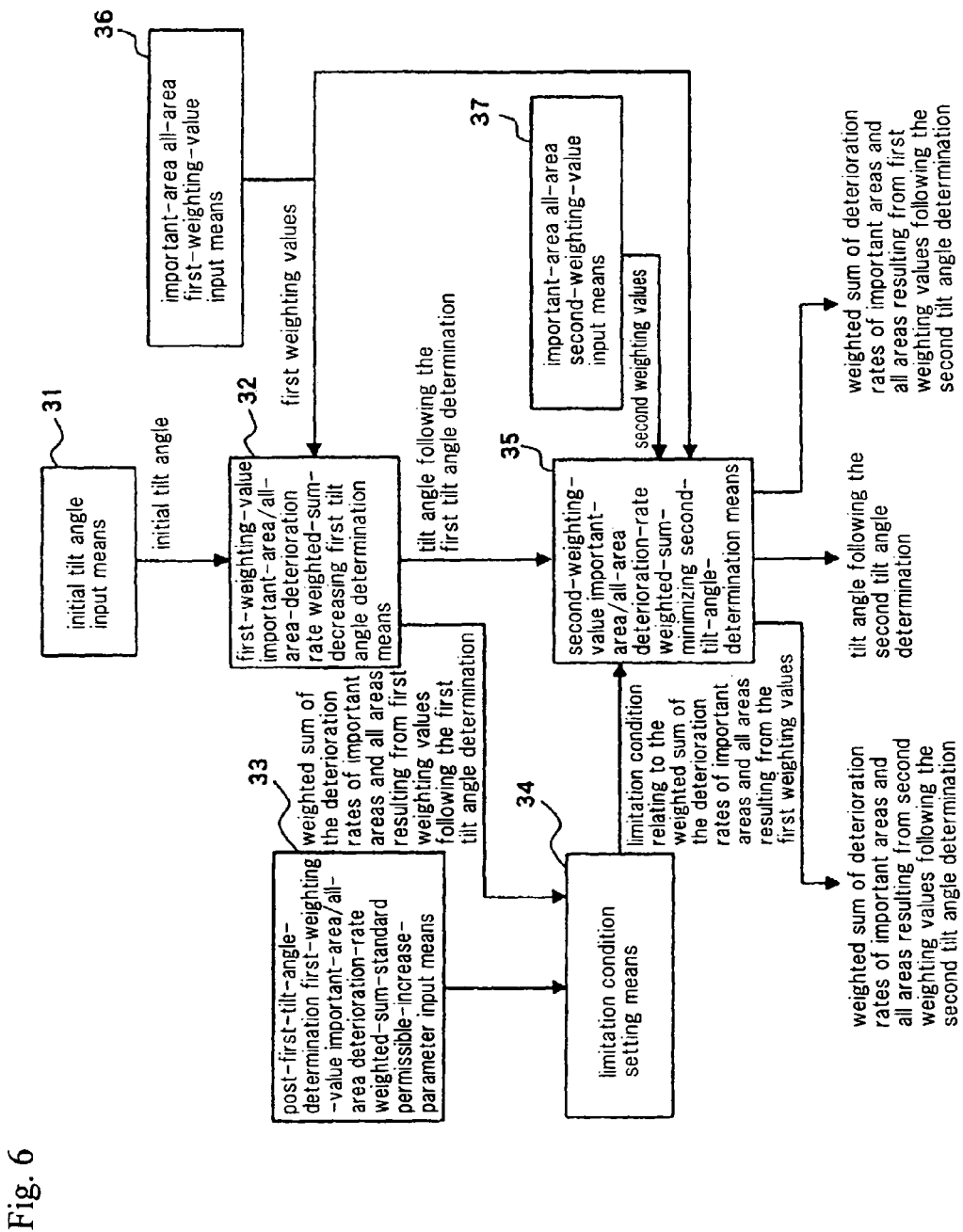
FIG. 6 is a block diagram showing the configuration of the tilt angle determination device according to the third embodiment of the present invention.

FIG. 6 is a block diagram showing the configuration of a tilt angle determination device according to the third embodiment of the present invention.

The third embodiment has a mode that enables the continuous execution of the intermediate operations of the first embodiment and second embodiment by means of weighting values. In the present embodiment, a process is first carried out for decreasing the deterioration rate of important areas and all areas by means of weighting values, and then carrying out a process for decreasing the deterioration rate of important areas and all areas by means of different weighting values. This processing corresponds to processing a a device for adjusting the proportion of the process for decreasing the deterioration rate of important areas first and the process for later decreasing the deterioration rate of important areas in order to decrease the deterioration rate of not only all areas but of important areas as well.

The third embodiment is made up from: antenna initial tilt angle input means 31, important-area all-area first-weighting-value input means 36, first-weighting-value important-area/all-area-deterioration rate weighted-sum-decreasing first tilt angle determination means 32, post-first-tilt-angle-determination first-weighting-value important-area/all-area deterioration-rate weighted-sum-standard permissible-increase-parameter input means 33, limitation condition setting means 34, important-area all-area second-weighting-value input means 37, and second-weighting-value important-area/all-area deterioration-rate weighted-sum-decreasing second-tilt-angle-determination means 35.

Antenna initial tilt angle input means 31 accepts the input of the initial tilt angle from the user of the radio network design tool and then supplies the initial tilt angle to first-weighting-value important-area/all-area-deterioration rate weighted-sum-decreasing first tilt angle determination means 32.

Important-area all-area first-weighting-value input means 36 accepts the input of the first weighting values of important areas and all areas from the user of the radio network design tool, and then supplies the first weighting values of important areas and all areas to: first-weighting-value important-area/all-area-deterioration rate weighted-sum-decreasing first tilt angle determination means 32, and second-weighting-value important-area/all-area deterioration-rate weighted-sum-decreasing second-tilt-angle-determination means 35.

First-weighting-value important-area/all-area-deterioration rate weighted-sum-decreasing first tilt angle determination means 32 takes the initial tilt angle as the initial value and finds a tilt angle for which the weighted sum of the deterioration rate of important areas and all areas resulting from the first weighting values is smaller than at the time of the initial value, and supplies this tilt angle to second-weighting-value important-area/all-area deterioration-rate weighted-sum-decreasing second-tilt-angle-determination means 35. The method of finding the tilt angle for which the weighted sum of deterioration rate is smaller is identical to that of the first embodiment. In addition, first-weighting-value important-area/all-area-deterioration rate weighted-sum-decreasing first tilt angle determination means 32 simultaneously supplies the weighted sum of the deterioration rates of important areas and all areas resulting from the first weighting values in the tilt angle after the first tilt angle is determined to limitation condition setting means 34.

Post-first-tilt-angle-determination first-weighting-value important-area/all-area deterioration-rate weighted-sum-standard permissible-increase-parameter, input means 33 accepts the input of a permissible increase parameter that takes as a standard the weighted sum of the deterioration rates of important areas and all areas resulting from the first weighting values after the first tilt angle is determined, from the user of the radio network design tool, and then supplies the permissible increase parameter to limitation condition setting means 34.

Limitation condition setting means 34 uses the permissible increase parameter from post-first-tilt-angle-determination first-weighting-value important-area/all-area deterioration-rate weighted-sum-standard permissible-increase-parameter input means 33 and the weighted sum of the deterioration rates of important areas and all areas resulting from the first weighting values after the first tilt angle is determined to supply a limitation condition relating to the weighted sum of the deterioration rates of important areas and all areas resulting from the first weighting values to second-weighting-value important-area/all-area deterioration-rate weighted-sum-decreasing second-tilt-angle-determination means 35.

Important-area all-area second-weighting-value input means accepts the input of the second weighting values of important areas and all areas that differs from the first weighting values from the user of the radio network design tool. Second-weighting-value important-area/all-area deterioration-rate weighted-sum-decreasing second-tilt-angle-determination means 35 takes the tilt angle after the first tilt angle is determined as the initial value, finds a tilt angle for which the weighted sum of the deterioration rates of important areas and all areas resulting from the second weighting values is becomes smaller than when the first tilt angle was determined while satisfying the limitation conditions relating to the weighted sum of the deterioration rates of important areas and all areas resulting from the first weighting values, and supplies this tilt angle to the outside as the tilt angle after the second tilt angle is determined. The method for finding the tilt angle for which the deterioration rates are decreased used in the second tilt angle determination means is similar to that of the first embodiment. In addition, second-weighting-value important-area/all-area deterioration-rate weighted-sum-decreasing second-tilt-angle-determination means 35 supplies the following to the outside: the weighted sum of the deterioration rates of important areas and all areas resulting from the second weighting values in the tilt angle after the second tilt angle is determined, and the weighted sum of deterioration rates of important areas and all areas resulting from the first weighting values.

The configuration and operations of first tilt angle determination means 32 in the third embodiment are identical to the configuration and operations of first tilt angle determination means 12 in the first embodiment.

The configuration and operations of second tilt angle determination means 35 in the third embodiment are identical to the configuration and operations of second tilt angle determination means 15 in the first embodiment.

However, the third embodiment is executed with different values for the first weighting values and second weighting values of all areas and important areas.

Figure 7A:
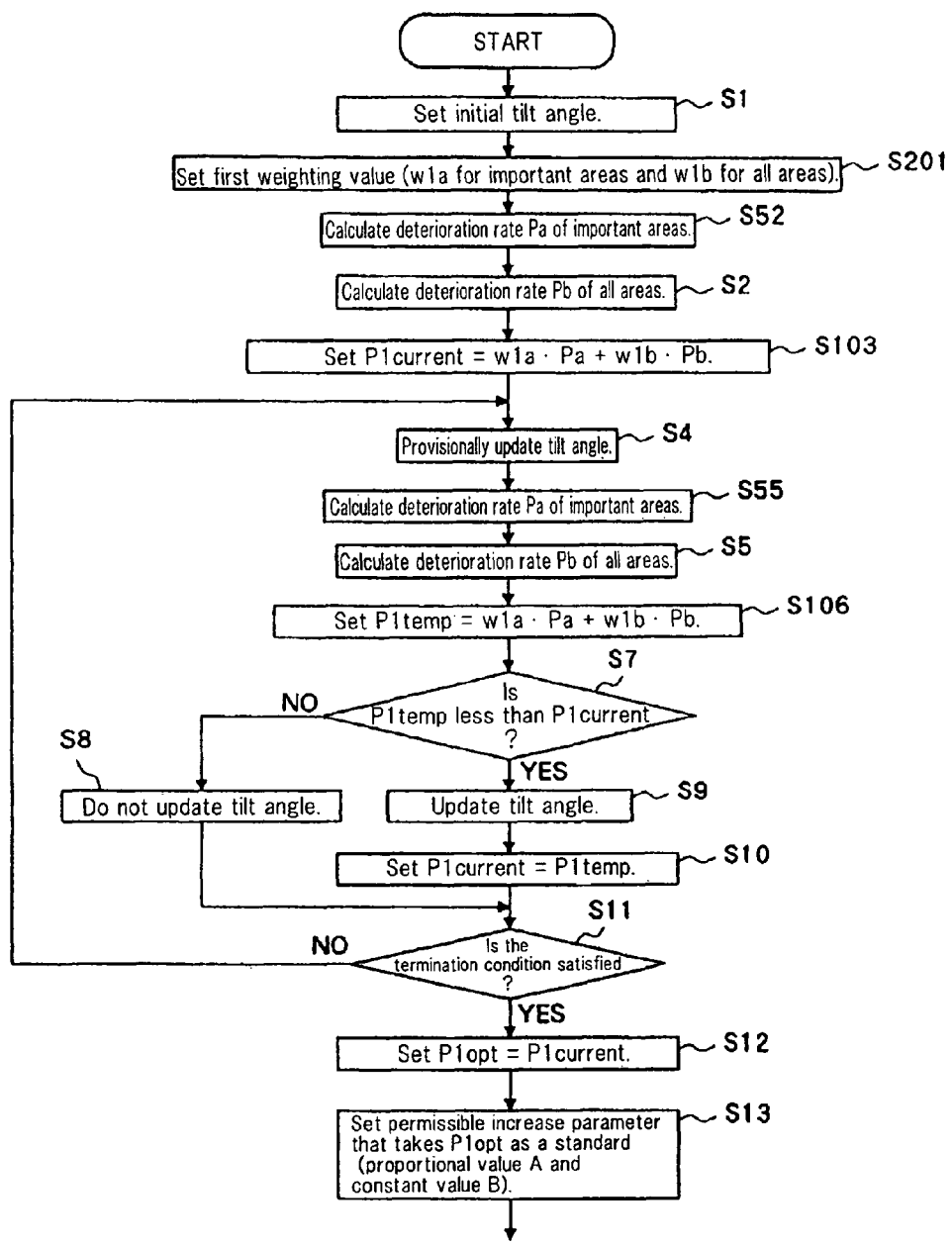
FIG. 7a is a flow chart showing the processing and operations of the tilt angle determination method that shows the operations of the third embodiment of the present invention.
Figure 7B:
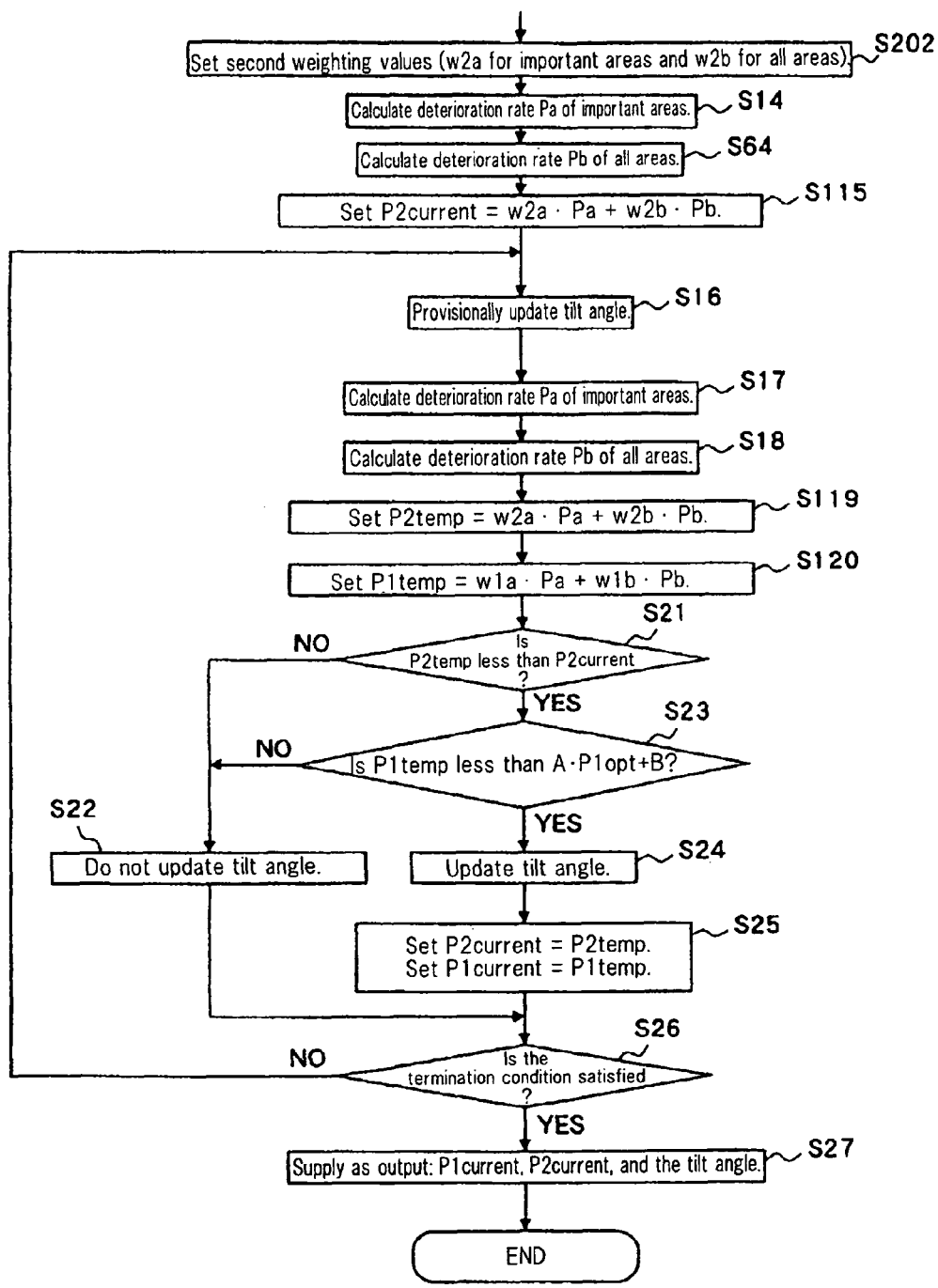
FIG. 7b is a flow chart showing the processing and operations of the tilt angle determination method that shows the operations of the third embodiment of the present invention.

FIGS. 7a and 7b are flow charts showing the processes and operations of the present embodiment.

The flow charts shown in FIGS. 7a and 7b are basically identical to the flow charts shown in FIG. 3 explained in the first embodiment, but differ in the following steps:

The step for setting P1current=Pb (Step S3) is replaced by the step for setting P1current=w1a·Pa+w1b·Pb (Step S103).

The step for setting P1temp=Pb (Step S6) is replaced by the step for setting P1temp=w1a·Pa+w1b·Pb (Step S106).

The step for setting P2current=Pa (Step S15) is replaced by the step for setting P2current=w2a·Pa+w2b·Pb (Step S115).

The step for setting P2temp=Pa (Step S19) is replaced by the step for setting P2temp=w2a+w2b·Pb (Step S119).

The step for setting P1temp=Pb (Step S20) is replaced by the step for setting P1temp=w1a·Pa+w1b·Pb (Step S120).

A step for setting important-area weighting value w1a and all-area weighting value w1b as the first weighting values of important areas and all areas (Step S201) and a step for calculating deterioration rate Pa of important areas (Step S52) are added between the step for setting the initial tilt angle (Step S1) and the step for calculating deterioration rate Pb of all areas (Step S2).

A step for calculating deterioration rate Pa of important areas (Step S55) is added between the step for provisionally updating the tilt angle (Step S4) and the step for calculating deterioration rate Pb of all areas (Step S5).

A step for setting important-area weighting value w2a and all-area weighting value w2b as the second weighting values of important areas and all areas (Step S202) is added between the step for setting the permissible increase parameter that takes P1opt as a standard (Step S13) and the step for calculating deterioration rate Pa of important areas (Step S14).

A step for calculating deterioration rate Pb of all areas (Step S64) is added between the step for calculating deterioration rate Pa of important areas (Step S14) and the step for setting P2current=w2a·Pa+w2b·Pb (Step S115).

The operations in the flow of processes are basically identical to those of the first embodiment with the exception of the processes of the above-described replacement steps.

In the present embodiment, a process is first implemented for decreasing the weighted sum of the deterioration rates of important areas and all areas resulting from the first weighting values, and the results of this process are then used to implement a process for decreasing the deterioration rates of important areas and all areas resulting from the second weighting values that differ from the first weighting values. In addition, in the processes for decreasing the deterioration rates of important areas and all areas resulting from the second weighting values, a limitation condition is applied such that the weighted sum of the deterioration rates of important areas and all areas resulting from the first weighting values does not become excessively large.

The present embodiment is a process that takes as an objective function the decrease of the weighted sum of deterioration rates of important areas and all areas resulting from weighting values and successively implements processes for decreasing the weighted sum of deterioration rates relating to two different types of weighting values. The process for decreasing the weighted sum of deterioration rates that is implemented later is carried out while applying a limitation condition to the weighted sum of the deterioration rates that were found earlier. An intermediate form of the first embodiment and second embodiment is continuously realized by changing the weighting values.

A case in which $(w1a, w1b)=(0, 1)$ for the first weighting values and $(w2a, w2b=1, 0)$ for the second weighting values corresponds to processing equivalent to the first embodiment that first implements a process for decreasing the deterioration rate of all areas and then implements a process for decreasing the deterioration rate of important areas.

In addition, a case in which $(w1a, w1b)=(1, 0)$ for second weighting values and $(w2a, w2b=0, 1)$ for second weighting values corresponds to processing equivalent to the second embodiment that first implements a process for decreasing the deterioration rate of important areas and then implements a process for decreasing the deterioration rate of all areas.

However, when $(w1a, w1b)=(w2a, w2b)$, the present embodiment repeats the same process of decreasing the weighted sum of the deterioration rates of important areas and all areas and is therefore equivalent to implementing a process one time. As a result, the effect of decreasing the deterioration rate of important areas is identical to a case in which a process is carried out one time. Based on the foregoing explanation, the present embodiment includes not only a process for decreasing the deterioration rate of all areas but also includes a process for decreasing the deterioration rate of important areas, as in the first embodiment. Thus, in contrast to the method of the related art in which only the deterioration rate of all areas is decreased, the present embodiment further enables decrease of the deterioration rate of important areas.

Still further, in the present embodiment, a process is first carried out for decreasing the weighted sum of the deterioration rates of important areas and all areas resulting from first weighting values, the results are used to carry out a process for decreasing the weighted sum of the deterioration rates of important areas and all areas resulting from second weighting values that differ from the first weighting values, and in the process for decreasing deterioration rates of important areas and all areas resulting from the second weighting values, a limitation condition is applied such that the weighted sum of the deterioration rates of important areas and all areas resulting from the first weighting values does not become excessively large, whereby the deterioration rates of important areas and all areas resulting from the second weighting values can be decreased while suppressing increase of the weighted sum of the deterioration rates of important areas and all areas resulting from the first weighting values.

Adjusting the first weighting values and second weighting values enables the realization of a process that is interposed between the first embodiment and the second embodiment. In other words, the deterioration rates of all areas and important areas can be decreased with proper balance by adjusting the first weighting values and second weighting values to thereby adjust the proportion of the process for first decreasing the deterioration rate of important areas and the process for then decreasing the deterioration rate of important areas.

In the third embodiment, a case was described in which the tilt angle of an antenna was taken as a radio parameter, but the radio parameter determination device of the present invention can be similarly implemented without any loss of general applicability if the object of updating is changed from the tilt angle of an antenna and replaced by the height of the antenna above the ground or by the transmission power of the pilot channel transmitted from the antenna. The specific method of replacement is identical to the replacement method described in the first embodiment.

Replacing processes for decreasing the deterioration rate that have been described in the third embodiment with processes for increasing radio capacity means only that the deterioration rate is replaced by the radio capacity as the objective function and that processes for decreasing the deterioration rate are replaced by processes for increasing the radio capacity, and the general applicability of the radio parameter determination method according to the present invention is not lost.

In other words, in the third embodiment, the processes for decreasing the deterioration rate are replaced by processes for increasing the radio capacity, whereby increase of radio capacity can be implemented similar to decrease of the deterioration rate.

As described hereinabove, the present embodiment has the effect of obtaining radio parameters for improving communication service quality, i.e., the deterioration rate or radio capacity, not only in all areas but in important areas as well.

As described hereinabove, each of the embodiments of the present invention has the effect of obtaining radio parameters for improving communication service quality, as represented by the deterioration rate or radio capacity, not only in all areas but in important areas as well.

What is claimed is:

1. A radio parameter determination method, which is a method of determining radio parameters of antennas of each radio base station in a radio communication system made up from a plurality of radio base stations arranged in areas that include a first area and a second area, said method comprising steps of:
  accepting a first radio parameter that is an initial value;
  finding a second radio parameter based on said first radio parameter and a first weighted sum found by means of first weighting values from communication service quality of said first area and the communication service quality of said second area;
  accepting a limitation condition relating to said first weighted sum; and
  determining a third radio parameter based on: said limitation condition, a second weighted sum found by means of second weighting values from the communication service quality of said first area and from the communication service quality of said second area, and said second radio parameter,
  wherein said first area is important areas that include government offices, municipal offices, major highways or facilities such as schools that have been designated as evacuation sites; and said second area is all areas including important areas,
  wherein, regarding first weighting values, the weighting value of important areas is "0" and the weighting value of all areas is "1"; and regarding the second weighting values, the weighting value of important areas is "1" and the weighting value of all areas is "0".

2. A radio parameter determination method, which is a method of determining radio parameters of antennas of each radio base station in a radio communication system made up from a plurality of radio base stations arranged in areas that include a first area and a second area said method comprising steps of:
  accepting a first radio parameter that is an initial value;
  finding a second radio parameter based on said first radio parameter and a first weighted sum found by means of first weighting values from communication service quality of said first area and the communication service quality of said second area;
  accepting a limitation condition relating to said first weighted sum; and
  determining a third radio parameter based on: said limitation condition, a second weighted sum found by means of second weighting values from the communication service quality of said first area and from the communication service quality of said second area, and said second radio parameter,
  wherein said first area is important areas that include government offices, municipal offices, major highways or facilities such as schools that have been designated as evacuation sites; and said second area is all areas including important areas,
  wherein, regarding first weighting values, the weighting value of important areas is "1" and the weighting value of all areas is "0"; and regarding second weighting values, the weighting value of important areas is "0" and the weighting value of all areas is "1".

* * * * *